(12) United States Patent
Takahashi et al.

(10) Patent No.: US 10,545,708 B2
(45) Date of Patent: Jan. 28, 2020

(54) INFORMATION PROCESSING SYSTEM AND METHOD OF PROCESSING INFORMATION

(71) Applicants: Rina Takahashi, Kanagawa (JP); Shigeo Araki, Kanagawa (JP)

(72) Inventors: Rina Takahashi, Kanagawa (JP); Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/161,351

(22) Filed: Oct. 16, 2018

(65) Prior Publication Data
US 2019/0129669 A1    May 2, 2019

(30) Foreign Application Priority Data

Oct. 26, 2017 (JP) ................................. 2017-207634
Jul. 23, 2018 (JP) ................................. 2018-138044

(51) Int. Cl.
G06F 3/12    (2006.01)
H04W 4/80    (2018.01)
H04N 1/00    (2006.01)

(52) U.S. Cl.
CPC .......... G06F 3/1271 (2013.01); G06F 3/1204 (2013.01); G06F 3/1285 (2013.01); H04N 1/00477 (2013.01); H04W 4/80 (2018.02)

(58) Field of Classification Search
CPC ............................... G06F 3/1271; H04W 4/80
See application file for complete search history.

(56) References Cited

U.S. PATENT DOCUMENTS

| 5,706,410 A * | 1/1998 | Bagley .................. G06K 15/00 358/1.13 |
| 2010/0238494 A1 | 9/2010 | Araki |
| 2010/0318984 A1 | 12/2010 | Araki |
| 2011/0019228 A1* | 1/2011 | Uchikawa ............. G06F 3/1204 358/1.15 |
| 2011/0058205 A1 | 3/2011 | Araki |

(Continued)

FOREIGN PATENT DOCUMENTS

JP    2014-139823    7/2014
JP    2015-108950    6/2015

*Primary Examiner* — Ibrahim Siddo
(74) *Attorney, Agent, or Firm* — Oblon, McClelland, Maier & Neustadt, L.L.P.

(57) ABSTRACT

An information processing system includes a terminal device, one or more image forming apparatuses communicably connected to the terminal device using short-distance wireless communication, and an information processing apparatus to provide a service that is in cooperation with a print service provided by an external printing system. The terminal device receives an operation of selecting one image forming apparatus from among the one or more image forming apparatuses and transmits, to the external printing system, a print request including an apparatus identifier identifying the selected image forming apparatus. The information processing apparatus acquires a print job generated by the external printing system based on the print request transmitted from the terminal device, stores the acquired print job in a memory, and transmits the print job stored in the memory to the selected image forming apparatus in response to a request transmitted from the selected image forming apparatus.

13 Claims, 18 Drawing Sheets

(56) References Cited

U.S. PATENT DOCUMENTS

| | | |
|---|---|---|
| 2012/0086970 A1 | 4/2012 | Takahashi |
| 2012/0268796 A1 | 10/2012 | Takahashi |
| 2013/0063746 A1 | 3/2013 | Araki |
| 2013/0070282 A1 | 3/2013 | Takahashi |
| 2013/0143496 A1* | 6/2013 | Lee .................. G06F 3/041 455/41.2 |
| 2014/0010566 A1 | 1/2014 | Takahashi et al. |
| 2014/0204421 A1 | 7/2014 | Araki |
| 2014/0233058 A1* | 8/2014 | Aritomi ............ G06F 3/1292 358/1.15 |
| 2014/0294421 A1 | 10/2014 | Takahashi et al. |
| 2016/0165076 A1* | 6/2016 | Tokiwa ............ H04N 1/00244 358/1.15 |
| 2016/0366292 A1* | 12/2016 | Anezaki ........... H04N 1/00244 |
| 2017/0048405 A1* | 2/2017 | Park ................ H04N 1/00244 |
| 2018/0067700 A1 | 3/2018 | Araki |
| 2018/0152430 A1 | 5/2018 | Takahashi |

\* cited by examiner

INFORMATION PROCESSING SYSTEM AND METHOD OF PROCESSING INFORMATION

CROSS-REFERENCE TO RELATED APPLICATIONS

This patent application is based on and claims priority pursuant to 35 U.S.C. § 119(a) to Japanese Patent Application Nos. 2017-207634, filed on Oct. 26, 2017, and 2018-138044, filed on Jul. 23, 2018, in the Japan Patent Office, the entire disclosures of which are hereby incorporated by reference herein.

BACKGROUND

Technical Field

The embodiments of the present disclosure relate to an information processing system and a method of processing information.

Related Art

In recent years, various services are provided with advances in technology of cloud computing, etc. For example, a technique in which an image forming apparatus cooperates with a cloud service is known. More specifically, in such a technique, print data to be printed, such as document data, is transmitted from a personal computer (PC), a smartphone, or the like to the cloud service, and the print data is printed by the image forming apparatus.

In addition, there is a technique in which a printer selection screen is displayed when a cloud type print server receives a print request, and a print job is converted in a format associated with a printer that is selected by a user via the printer selection screen.

SUMMARY

An exemplary embodiment of the present disclosure includes an information processing system including a terminal device, one or more image forming apparatuses, and an information processing apparatus. The terminal device is communicably connected to the one or more image forming apparatuses using short-distance wireless communication. The information processing apparatus provides a service that is in cooperation with a print service provided by an external printing system. The terminal device receives an operation of selecting one image forming apparatus from among the one or more image forming apparatuses and transmits, to the external printing system, a print request including an apparatus identifier identifying the selected image forming apparatus. The information processing apparatus acquires a print job generated based on the print request transmitted from the terminal device by the external printing system. The information processing apparatus stores the acquired print job in a memory. The information processing apparatus transmits the print job stored in the memory to the selected image forming apparatus in response to a request transmitted from the selected image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
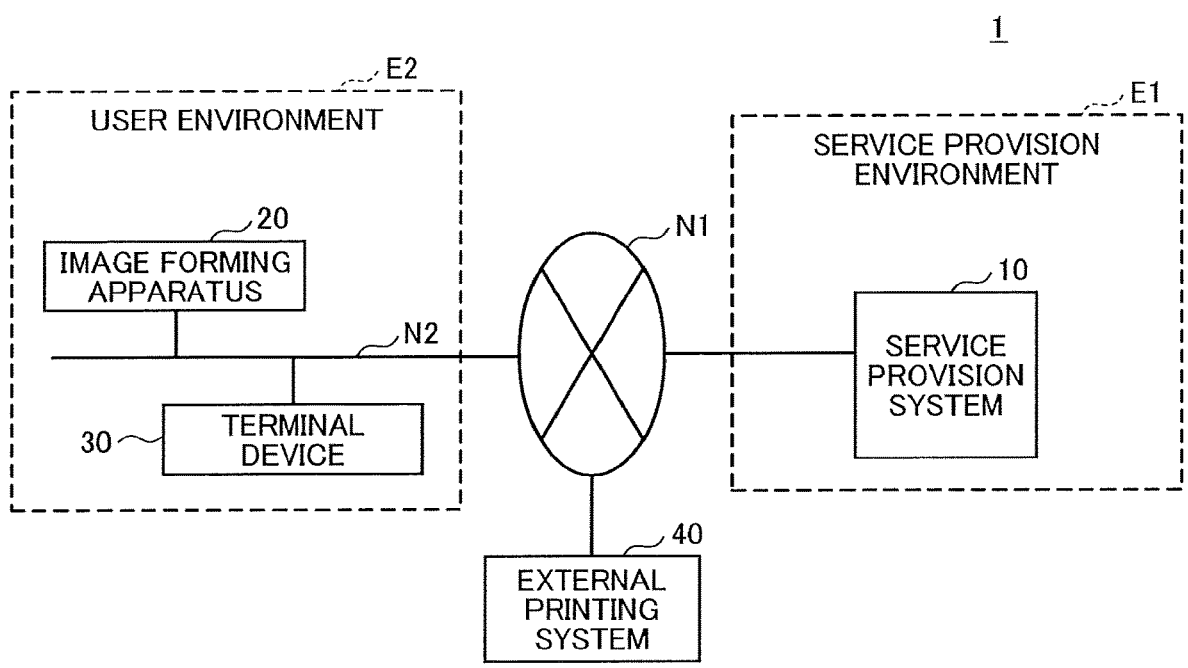
FIG. 1 is a diagram illustrating an example of an overall configuration of a printing system according to a first embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of several embodiments of the present disclosure, with reference to the attached drawings.

First Embodiment

Overview of System Configuration

A description is now given of an overview of a configuration of a printing system 1 according to a first embodiment of the present disclosure, with reference to FIG. 1.

FIG. 1 is a diagram illustrating an example of the overall configuration of the printing system 1 according to the present embodiment.

As illustrated in FIG. 1, the printing system 1 includes a service provision environment E1, a user environment E2, which are communicably connected to each other via a wide area network N1 such as the Internet. In addition, the printing system 1 illustrated in FIG. 1 is communicably connected to an external printing system 40 via the network N1.

The service provision environment E1 is a system environment that provides a service that is in cooperation with an external service such as a cloud service via the network N1. In the following description of the present embodiment, a cloud service is used as a specific example of external service, however, the external service is not limited to the cloud service. The present embodiment is applicable in relation to other various services, for example, a service provided by an Application Service Provider (ASP) and a web service, which are provided via a network.

The service provision environment E1 includes a service provision system 10 that is implemented by one or more information processing apparatus. The service provision system 10 provides predetermined services via the network N1.

For example, the service provision system 10 provides a print service (cloud cooperation print service) that is in cooperation with a cloud service (cloud print service) provided by the external printing system 40. The service provision system 10 according to the present embodiment is described as a system that provides such a cloud cooperation print service, which is, hereinafter, also simply referred to as a "cloud cooperation print".

In addition, all or a part of the service provision system 10 may be provided in the user environment E2. That is, all or a part of the information processing apparatuses, which configure the service provision system 10, may be included in the user environment E2.

The user environment E2 is, for example, a system environment used by an organization such as a company to which a user who uses an image forming apparatus 20 belongs. In the user environment E2, one or more image forming apparatuses 20 and one or more terminal devices 30 are communicably connected to each other via a network N2 such as a Local Area Network (LAN).

The image forming apparatus 20 according to the present embodiment is an apparatus that has a print function (printing function). The image forming apparatus 20 may be a multifunction peripheral (MFP) that has various functions, for example, such as a copy function, a scan function, and a facsimile (FAX) communication function, in addition to the print function. When more than one image forming apparatuses 20 is necessary to be distinguished from each other, each of the image forming apparatuses 20 may be referred to as an "image forming apparatus 20-1", an "image forming apparatus 20-2", . . . or the like, in the following description. In addition, the one or more image forming apparatuses 20 may be collectively or individually referred to as the image forming apparatus 20 in the following description.

The terminal device 30 is a portable device that is operated by a user. Examples of the terminal device 30 include a smartphone, a tablet terminal, and a notebook Personal Computer (PC). In some embodiments, the terminal device 30 is not portable, but may be, for example, a desktop PC or the like. In addition, as another example of the terminal device 30, a game device, a Personal Digital Assistant (PDA), a digital camera, a wearable PC, or the like may be used.

The terminal device 30 transmits a print request to execute printing using the cloud print service to the external printing system 40 in response to a user instruction. In addition, the terminal device 30 detects the one or more image forming apparatuses 20 being around the terminal device 30 by short-distance wireless communication such as Bluetooth (registered trademark) and displays a screen for selecting one image forming apparatus 20 to be used for printing from the one or more image forming apparatuses 20. Hereinafter, the screen for selecting one image forming apparatus 20 from the one or more image forming apparatuses may be referred to as an apparatus selection screen.

The external printing system 40 is a computer system that provides the cloud print service via the network N1. In the description of the present embodiment, the cloud print service is, for example, a service of transmitting a print job that is generated based on a print request, which is transmitted from the terminal device 30, to an apparatus such as a printer registered in advance and processing the print job (executing printing). An example of the cloud print service includes Google Cloud Print.

The configuration of the printing system 1 illustrated in FIG. 1 is merely one example, and the printing system 1 may have any other suitable system configuration. For example, the terminal device 30 may be connected to the network N1 without being included in the user environment E2. In addition, the user environment E2 may include an apparatus such as a projector or a digital signage, for example.

Cloud Cooperation Print

Figure 2:
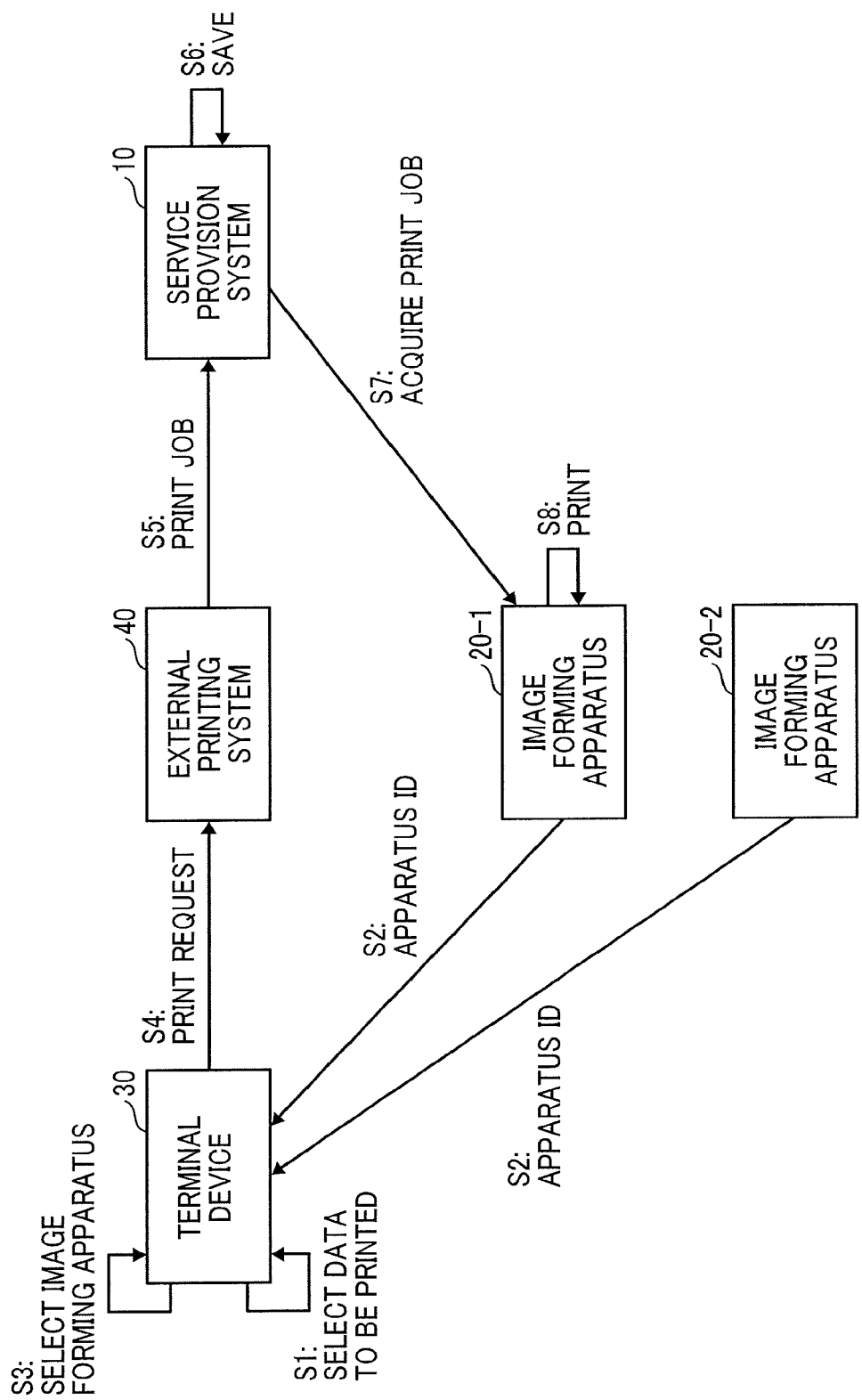
FIG. 2 is a diagram illustrating an example of a cloud cooperation print according to one of the embodiments of the disclosure.

A description is now given of the cloud cooperation print provided by the service provision system 10 according to the present embodiment, with reference to FIG. 2.

FIG. 2 is a diagram illustrating an example of the cloud cooperation print according to the present embodiment of the disclosure. In the example of FIG. 2, registration required to use the cloud print service is completed in advance.

At first, the terminal device 30 receives a selection operation of selecting data to be printed (Step S1). Hereinafter, the data to be printed may be referred to as print target data, and the selection operation of selecting print target data may be referred to as a print target data selection operation. The user selects print target data using, for example, an application installed in the terminal device 30. The print target data is electronic data such as document data and image data, for example.

Upon receiving the selection of the print target data, the terminal device 30 receives one or more apparatus IDs each of which identifies one of the one or more image forming apparatuses 20, which are installed around the terminal device 30, by short-distance wireless communication such as Bluetooth (Step S2). That is, the terminal device 30 receives the apparatus ID from the image forming apparatus 20 installed within a range in which the terminal device 30 is communicably connected by short-range wireless communication such as Bluetooth.

For example, when the image forming apparatus 20-1 and the image forming apparatus 20-2 are installed within the range in which the short-range wireless communication is effective to communicate with the terminal device 30, the terminal device 30 receives each apparatus ID of the image forming apparatus 20-1 and the image forming apparatus 20-2.

Instead of Bluetooth, Bluetooth Low Energy (BLE) or ZigBee may be used as the short-range wireless communication by the terminal device 30 to receive each apparatus ID.

Subsequently, the terminal device 30 displays a screen for selecting one of the image forming apparatuses 20 (apparatus selection screen). The apparatus selection screen displays a list of the image forming apparatuses 20 each of which is identified by the corresponding apparatus ID received in the above-described Step S2. The terminal device 30 receives a selection operation of selecting one of the image forming apparatuses 20 from the user via the apparatus selection screen (Step S3). Hereinafter, the selection operation of selecting one of the image forming apparatuses 20 may be referred to as an apparatus selection operation.

Upon receiving the selection of the image forming apparatus 20, the terminal device transmits a print request to the external printing system 40 (Step S4). The print request includes the print target data selected by the user and the apparatus ID for identifying the image forming apparatus 20 selected by the user. In addition to the print target data and the apparatus ID, the print request includes various kinds of information such as print setting information.

Upon receiving the print request from the terminal device 30, the external printing system 40 generates a print job based on the print request and transmits the print job to the service provision system 10 (Step S5).

Subsequently, upon receiving the print job from the external printing system 40, the service provision system 10 saves the print job (Step S6). In this manner, the service provision system 10 stores each print job received from the external printing system 40, and a plurality of print jobs may be accumulated in the service provision system 10.

The print job stored in the service provision system 10 includes print data and the apparatus ID, which is described above. The print data is data that is converted from the print target data by the external printing system 40, and is, for example, data in Portable Document Format (PDF). However, the data format of the print data is not limited to PDF and may differ depending on the external printing system 40.

Then, the image forming apparatus 20 transmits the own apparatus ID to the service provision system 10 to acquire a print job that includes an apparatus ID identical to the own apparatus ID among the print jobs stored in the service provision system 10 (Step S7).

The image forming apparatus 20 transmits the own apparatus ID to the service provision system 10 at predetermined time intervals, which may be set by a designer or a user, for example. For example, the user may select predetermined time intervals from among options set in advance. In addition, the predetermined time intervals may be, for example, every one minute or every several seconds, which are determined when the related system is designed. That is, the image forming apparatus 20 polls to check whether a print job including an apparatus ID identical to the own apparatus ID is stored in the service provision system 10 or not. In addition, or alternatively, the image forming apparatus 20 may transmit the apparatus ID to the service provision system 10 in response to a notification, which is transmitted when the terminal device 30 executes a job, received from the terminal device 30.

Then, the image forming apparatus 20 processes and prints the print data included in the print job acquired in Step S7 (Step S8). Accordingly, the user can execute printing using a desired one of the image forming apparatuses 20 installed around the user.

As described above, in the printing system 1 according to the present embodiment of the disclosure, the user selects a desired one from the image forming apparatuses 20 installed around the user and executes printing with the selected image forming apparatus 20 using the cloud print service. Therefore, the printing system 1 according to the present embodiment enables the user to execute printing using the image forming apparatus 20 being in the vicinity of the user without registering the image forming apparatus 20 in the external printing system in advance.

Hardware Configuration

Figure 3:
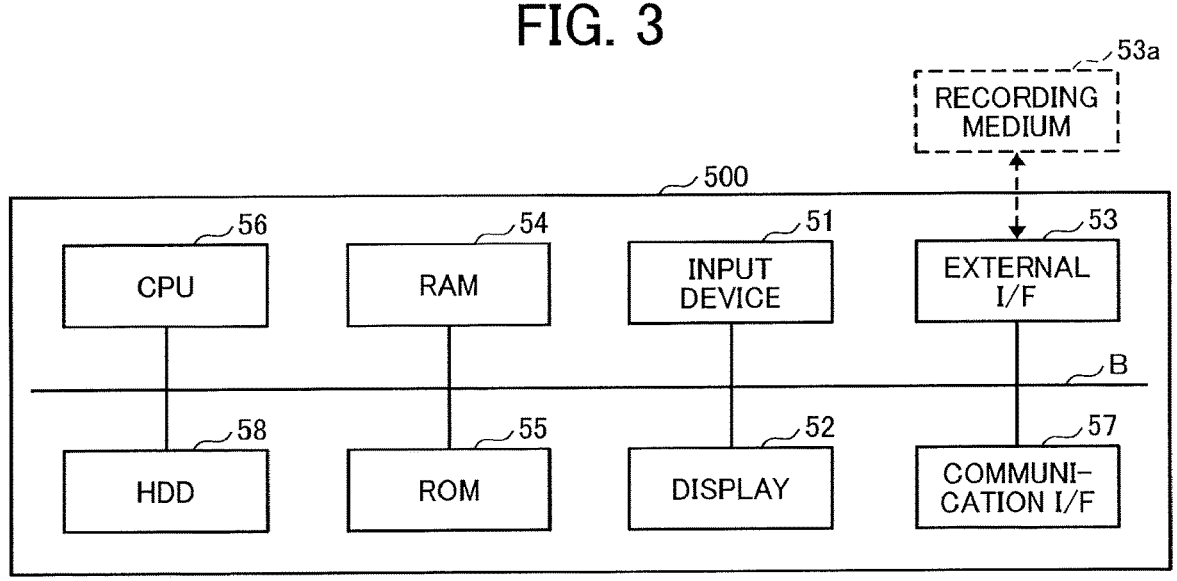
FIG. 3 is a block diagram illustrating an example of a hardware configuration of a computer according to one of the embodiments of the disclosure.

A description is now given of a hardware configuration of the service provision system 10 according to the present embodiment, with reference to FIG. 3.

FIG. 3 is a block diagram illustrating an example of a hardware configuration of a computer 500 according to the present embodiment.

Each of the one or more information processing apparatuses that implement the service provision system 10 according to the present embodiment is implemented with the computer 500 illustrated in FIG. 3. The terminal device 30 is also implemented with the computer 500 illustrated in FIG. 3.

The computer 500 illustrated in FIG. 3 includes an input device 51, a display 52, an external interface (I/F) 53, and a Random Access Memory (RAM) 54. The computer 500 also includes a Read Only Memory (ROM) 55, a Central Processing Unit (CPU) 56, a communication I/F 57, and a Hard Disk Drive (HDD) 58. The above-mentioned hardware components are connected to each other through a bus B.

The input device 51 includes at least one of a keyboard, a mouse, a touch panel, and the like. The input device 51 is used to input various operation signals by the user. The display 52 displays results of processing performed by the computer 500. In addition, the input device 51 and the display 52 are not necessarily constantly connected to the bus B. That is, at least one of the input device 51 and the display 52 may be connected to the computer 500 for use when being necessary.

The communication I/F 57 is an interface that connects the computer 500 to a network such as the network N1 or the network N2. The computer 500 can establish communication for transmitting and receiving data via the communication I/F 57. The communication I/F 57 of the terminal device 30 includes, for example, a module for establishing short-range wireless communication such as Bluetooth.

The HDD 58 is a nonvolatile storage device that stores programs and data. Examples of the programs and data stored in the HDD 58 include an Operating System (OS), which is a basic software, for controlling an overall operation of the computer 500 and application software providing various functions on the OS.

The computer 500 may include, instead of the HDD 58 or in addition to the HDD 58, a drive device such as a Solid State Drive (SSD) that uses a flash memory as a storage medium. The HDD 58 manages programs and data stored in the HDD 58 using a predetermined file system or a database (DB).

The external I/F 53 is an interface that connects the service provision system 10 to an external device. As an example of the external device, a recording medium 53*a* is used. The external I/F 53 enables the computer 500 to read or write data from or to the recording medium 53*a*. Examples of the recording medium 53*a* include a flexible disc, a Compact Disc (CD), a Digital Versatile Disc (DVD), a Secure Digital (SD) memory card, and a Universal Serial Bus (USB) memory.

The ROM 55 is a nonvolatile semiconductor memory that retains programs and data even after the computer 500 is turned off and when the power is not supplied. The ROM 55 stores programs and data such as a Basic Input Output System (BIOS), which is activated when the computer 500 is started up, OS settings, and network settings. The RAM 54 is a volatile semiconductor memory that temporarily stores programs and data.

The CPU 56 reads programs and data from a storage device such as the ROM 55 or the HDD 58 onto the RAM 54 and executes processing for controlling the computer 500 or implementing a function of the computer 500.

The hardware configuration of the computer 500 illustrated in FIG. 3 allows the one or more information processing apparatuses, which configure the service provision system 10 according to the present embodiment, to implement various kinds of processes as described later. In addition, the hardware configuration of the computer 500 illustrated in FIG. 3 allows the terminal device 30 according to the present embodiment to implement various kinds of processes as described later.

Figure 4:
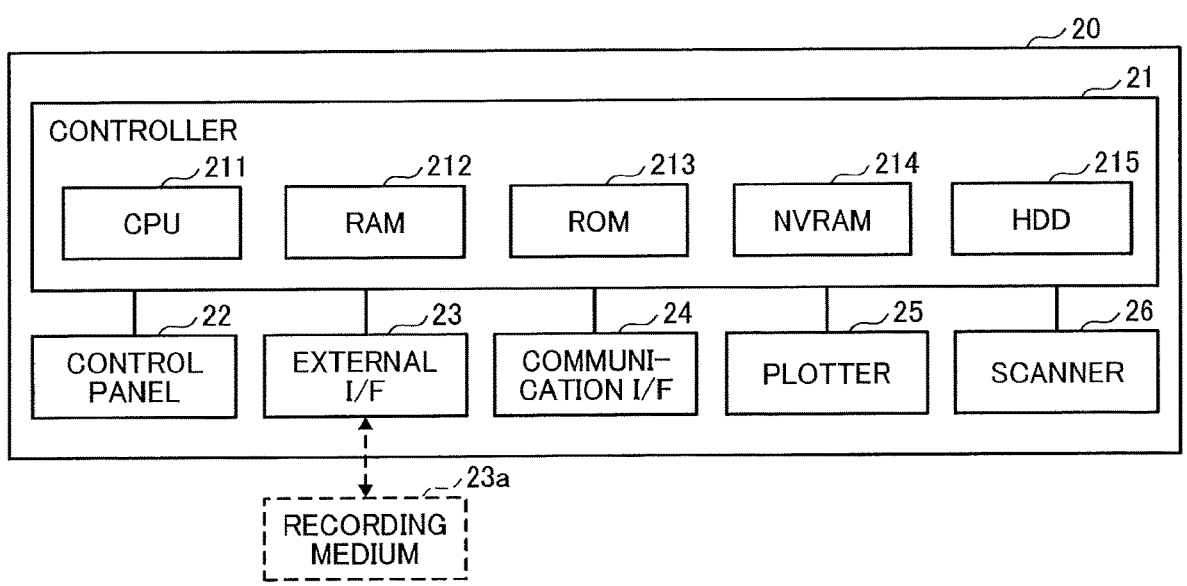
FIG. 4 is a block diagram illustrating an example of a hardware configuration of an image forming apparatus according to the first embodiment of the disclosure.

A description is now given of a hardware configuration of the image forming apparatus 20 according to the present embodiment, with reference to FIG. 4.

FIG. 4 is a block diagram illustrating an example of the hardware configuration of the image forming apparatus 20 according to the present embodiment.

The image forming apparatus 20 illustrated in FIG. 4 includes a controller 21, a control panel 22, an external I/F 23, a communication I/F 24, a plotter 25, and a scanner 26. The controller 21 includes a CPU 211, a RAM 212, a ROM 213, a Non-Volatile Random Access Memory (NVRAM) 214, and an HDD 215.

The ROM 213 is a nonvolatile semiconductor memory that stores programs and data. The RAM 212 is a volatile semiconductor memory that temporarily stores programs and data. The NVRAM 214 is a semiconductor memory that stores, for example, setting information. The HDD 215 is a nonvolatile storage device that stores programs and data.

The CPU 211 reads programs, data, setting information, and the like from the ROM 213, the NVRAM 214, the HDD 215 or the like, onto the RAM 212 to execute processing for controlling the image forming apparatus 20 or implementing a function of the image forming apparatus 20.

The control panel 22 includes an input unit for receiving a user input and a display unit for displaying various kinds of information.

The external I/F 23 is an interface that connects the image forming apparatus 20 to an external device. As an example of the external device, a recording medium 23*a* is used here. The image forming apparatus 20 reads or writes data from or to the recording medium 23*a* via the external I/F 23. Examples of the recording medium 23*a* include an Integrated Circuit (IC) card, a flexible disc, a CD, a DVD, a SD memory card, and a USB memory.

The communication I/F 24 is an interface that connects the image forming apparatus to the network N2. The image forming apparatus 20 can establish communication for transmitting and receiving data via the communication I/F 24. The communication I/F 24 of the image forming apparatus 20 includes, for example, a module for establishing short-range wireless communication such as Bluetooth.

The plotter 25 is a printing device that forms an image on a transfer medium based on print data. The transfer medium is not limited to a sheet of paper. The transfer medium may be an overhead projector (OHP) sheet, a plastic film, or a copper foil, for example. The scanner 26 is a reading device that reads a document to generate image data.

The hardware configuration illustrated in FIG. 4 allows the image forming apparatus according to the present embodiment to implement various kinds of processes as described later.

Functional Configuration

Figure 5:
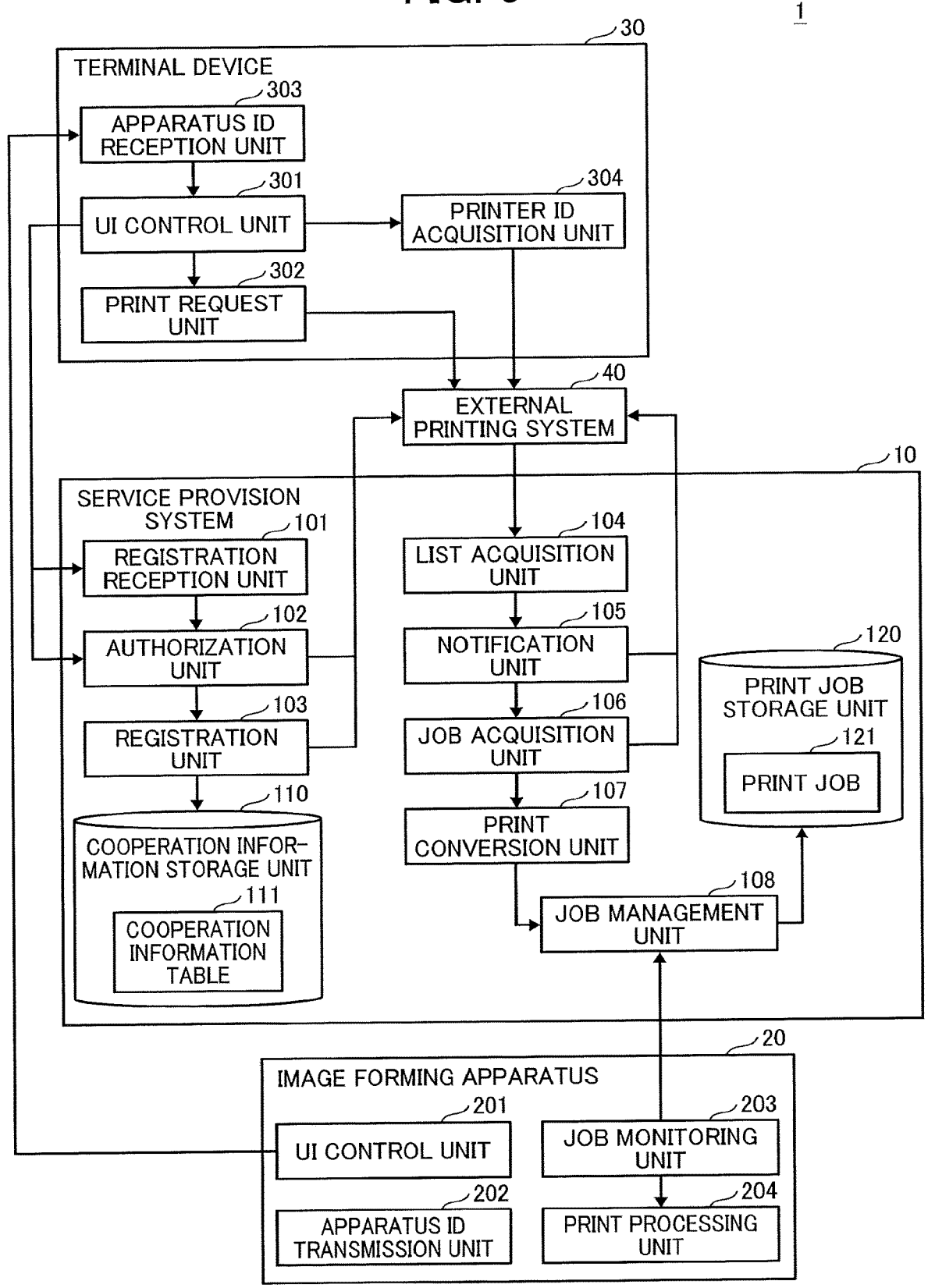
FIG. 5 is a block diagram illustrating an example of a functional configuration of the printing system according to the first embodiment of the disclosure.

A description is now given of a functional configuration of the printing system 1 according to the present embodiment, with reference to FIG. 5.

FIG. 5 is a block diagram illustrating an example of the functional configuration of the printing system 1 according to the present embodiment.

The terminal device 30 includes a User Interface (UI) control unit 301, a print request unit 302, an apparatus ID reception unit 303, and a printer ID acquisition unit 304. Each of the above-mentioned functional component is implemented by processing executed by the CPU 56 according to one or more programs installed on the terminal device 30.

The UI control unit 301 causes the display 52 to display various screens. The UI control unit 301 also receives various operations according to a user input to the input device 51.

The print request unit 302 transmits a print request, which includes print target data and an apparatus ID, to the external printing system 40 according to a user operation received by the UI control unit 301.

The apparatus ID reception unit 303 receives an apparatus ID from each one of the one or more image forming apparatuses 20 by short-distance wireless communication such as Bluetooth.

The printer ID acquisition unit 304 acquires a printer ID that identifies a printer (a virtual printer, which is described later) registered with the external printing system 40.

The image forming apparatus 20 includes a UI control unit 201, an apparatus ID transmission unit 202, a job monitoring unit 203, and a print processing unit 204. Each of the above-mentioned functional component is implemented by processing executed by the CPU 211 according to one or more programs installed on the image forming apparatus 20.

The UI control unit 201 causes the control panel 22 to display various screens. The UI control unit 201 also receives various operations according to a user input on a screen displayed on the control panel 22.

The apparatus ID transmission unit 202 transmits the apparatus ID by short-range wireless communication such as Bluetooth.

The job monitoring unit 203 transmits a request for a job to the service provision system 10 at predetermined time intervals, which may be set by a designer or a user, for example. For example, the user may select predetermined time intervals from among options set in advance. In addition, the predetermined time intervals may be, for example, every one minute or every several seconds, which are determined when the related system is designed. Hereinafter, the request for a job may be referred to as a job acquisition request. The job acquisition request includes the apparatus ID of the image forming apparatus 20. As described above, the job monitoring unit 203 may transmit the apparatus ID to the service provision system 10 in response to a notification from the terminal device 30, such as a notification transmitted when the terminal device 30 executes a job.

The print processing unit 204 prints print data included in a print job acquired from the service provision system 10 using the plotter 25.

The service provision system 10 includes a registration reception unit 101, an authorization unit 102, a registration unit 103, a list acquisition unit 104, a notification unit 105, a job acquisition unit 106, a print conversion unit 107, and a job management unit 108. Each of the above-mentioned functional component is implemented by processing executed by the CPU 56 according to one or more programs installed on the service provision system 10.

The service provision system 10 further includes a cooperation information storage unit 110 and a job storage unit 120. Each of the above-mentioned storage units is implemented with, for example, the HDD 58. At least one of the cooperation information storage unit 110 and the job storage unit 120 may be implemented with a storage device connected to the service provision system 10 through a network.

The registration reception unit 101 receives a request for registration to use the cloud cooperation print. Hereinafter, the request for registration may be referred to as a registration request.

The authorization unit 102 performs an authorization process conforming to Open Authorization (OAuth) with the external printing system 40. For example, the authorization unit 102 performs the authorization process by which the external printing system 40 authorizes the service provision system 10 when the user registers to use the cloud cooperation print using the terminal device 30.

When the authorization process is performed by the authorization unit 102, the registration unit 103 registers with the external printing system 40 for use of the cloud print service. That is, the registration unit 103 registers the service provision system 10 as a printer with the external printing system 40.

When the registration to use the cloud print service is performed, the registration unit 103 also stores, in a cooperation information table 111, a user ID that is used in the service provision system 10 to identify the user and an account ID that is used in the external printing system 40 to identify the user, in association with each other.

The account ID is an example of an identifier, or identification information, used in the external printing system 40 for identifying a user. An example of the account ID includes a mail address. However, the account ID is not limited to the mail address, and may be, for example, a telephone number, an arbitrary character string including alphanumeric characters, or the like.

The list acquisition unit 104 acquires a print job list, which may be, hereinafter, referred to as a job list, from the external printing system 40, in response to a notification received from the external printing system 40. The job list includes, for example, a job ID that identifies a print job and a status indicating a processing status in relation to a print job in the external printing system 40. Hereinafter, the status indicating a processing status in relation to a print job may be referred to as an execution status of a print job or a job status. The execution status of a print job includes, for example, "printed" and "unprocessed (unexecuted)".

The notification unit 105 notifies the external printing system 40 of a state of the service provision system 10 (e.g. "in process", "available for printing", etc.).

The job acquisition unit 106 transmits to the external printing system 40 a request for a print job that includes a status indicating "unprocessed" in the job list acquired by the list acquisition unit 104.

The print conversion unit 107 converts print data included in a print job acquired by the job acquisition unit 106 into a data format suitable for executing printing with the image forming apparatus 20 as necessary. For example, the print conversion unit 107 converts the print data in a PDF into a data format in which the print data can be printed by the image forming apparatus 20 or in which the print data can be printed at a speed higher than a current speed.

The job management unit 108 causes the job storage unit 120 to store a print job acquired by the job acquisition unit 106 or a print job of which a format is converted by the print conversion unit 107.

The cooperation information storage unit 110 stores the cooperation information table 111 in which a user ID, which is used in the service provision system 10 to identify the user, and an account ID, which is used in the external printing system 40 to identify the user, are associated with each other. The job storage unit 120 stores a print job 121.

Figure 6:
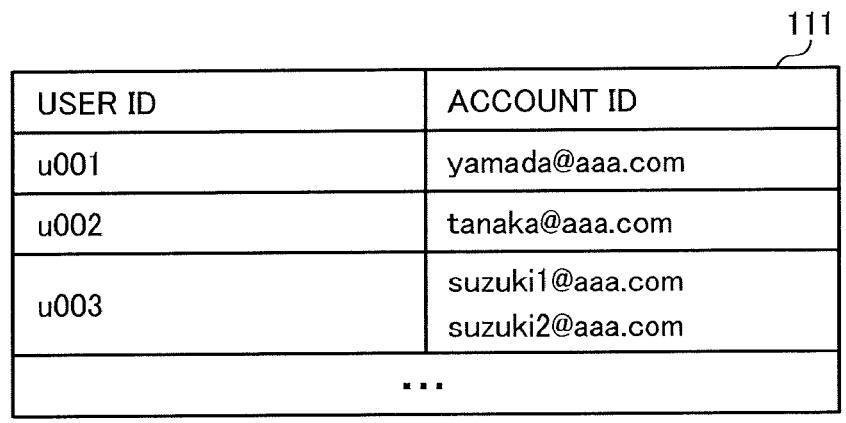
FIG. 6 is a conceptual diagram illustrating an example of a cooperation information table, according to one of the embodiments of the disclosure.

A description is now given of the cooperation information table 111 stored in the cooperation information storage unit 110, with reference to FIG. 6.

FIG. 6 is a conceptual diagram illustrating an example of the cooperation information table 111.

The cooperation information table 111 illustrated in FIG. 6 includes data items of "User ID" and "Account ID". As described above, the user ID is an identifier, or identification information, for identifying a user in the service provision system 10, and the account ID is an identifier, or identification information, for identifying a user in the external printing system 40.

As described above, in the cooperation information table 111, a user ID and an account ID are associated with each other. In addition, in the cooperation information table 111, a plurality of account IDs may be associated with a single user ID.

Operation

A detailed description is now given of operation performed by the printing system 1 according to the present embodiment.

Registration Process

Figure 7:
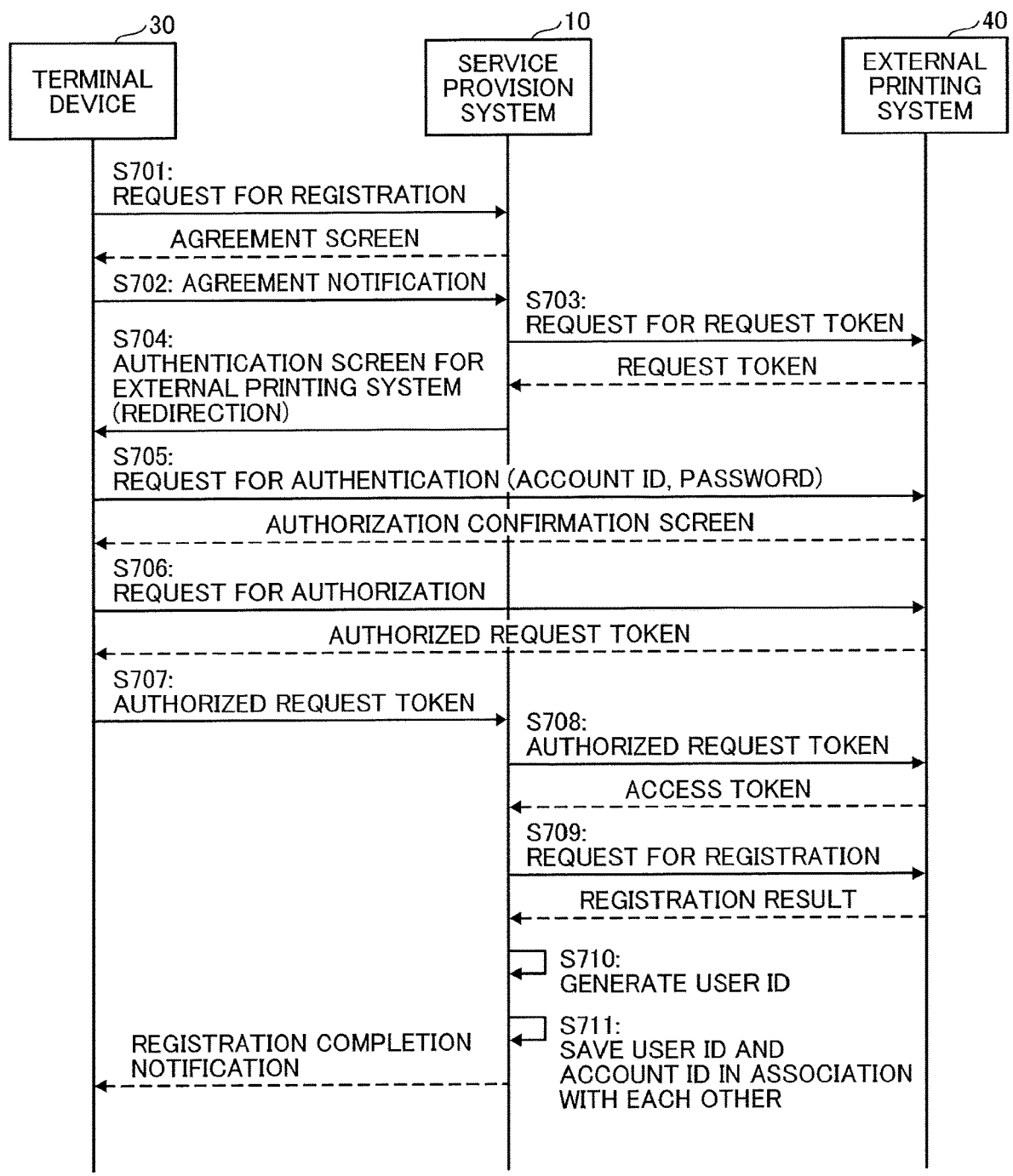
FIG. 7 is a sequence diagram illustrating an example of a registration process of registering to use a cloud cooperation print, according to the first embodiment of the disclosure.
Figure 8:
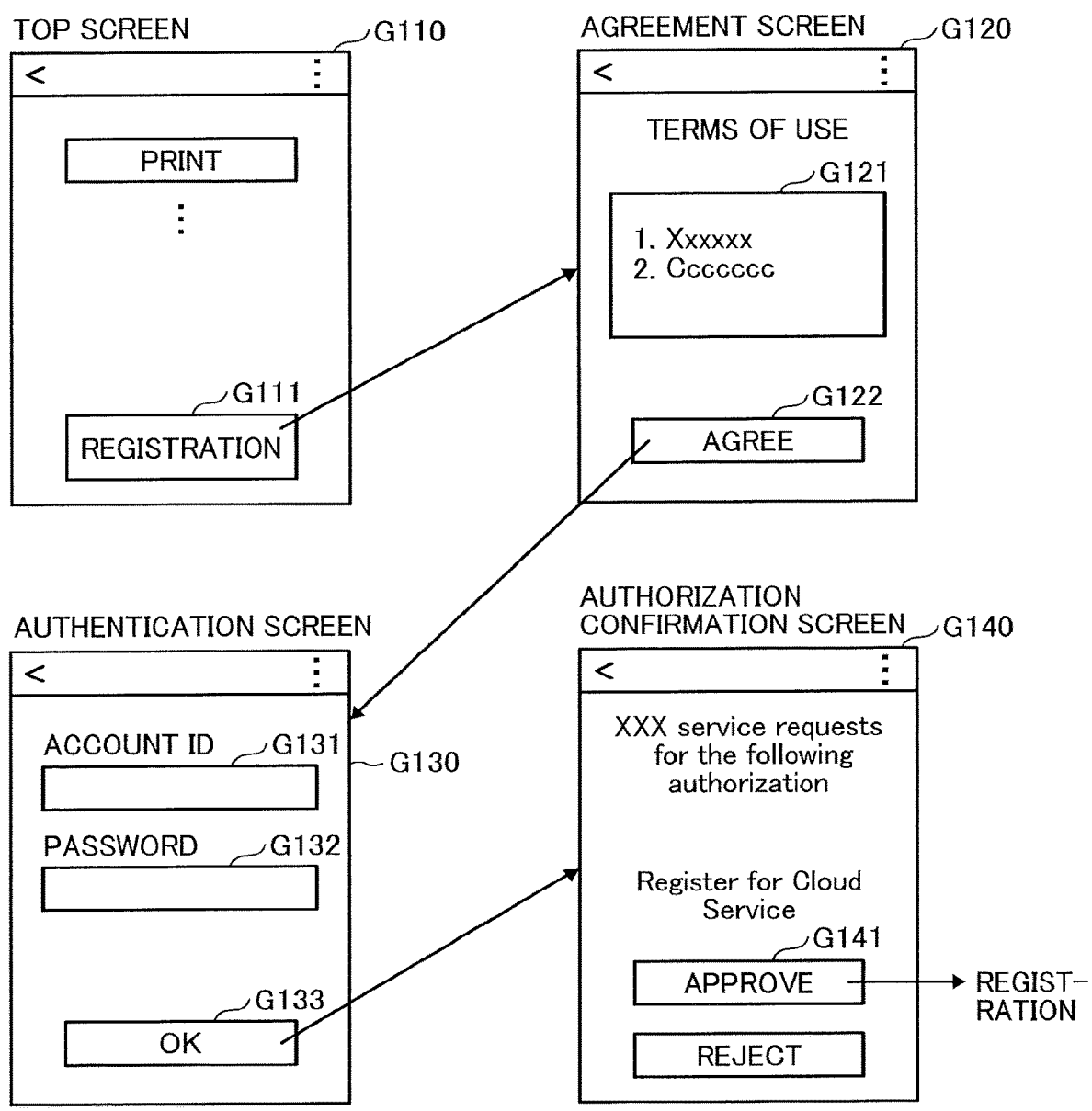
FIG. 8 is an illustration of an example of a screen transition of a terminal device in the registration process according to the first embodiment of the disclosure.

A description is now given of a registration process in which a user uses the terminal device 30 to register to use the cloud cooperation print, with reference to FIG. 7 and FIG. 8.

FIG. 7 is a sequence diagram illustrating an example of the registration process of registering to use the cloud cooperation print, according to the present embodiment. FIG. 8 is an illustration of an example of a screen transition of the terminal device 30 in the registration process according to the present embodiment.

It is assumed that a top screen G110 as illustrated in FIG. 8 is displayed on the terminal device 30 by the UI control unit 301. When the user presses a registration button G111, the UI control unit 301 transmits a request for registration, namely a registration request, to the service provision system 10 (Step S701). In the description here, "pressing a button" means any kinds of action or operation performed by the user to select a button, for example, touching or tapping a button on a screen, or clicking with a mouse while a pointer is pointing at a button on a screen.

In response to the registration request, the registration reception unit 101 of the service provision system 10 transmits to the terminal device 30 an agreement screen for allowing the user to confirm the terms of use of the cloud cooperation print. Accordingly, an agreement screen G120 as illustrated in FIG. 8 is displayed on the terminal device 30 by the UI control unit 301.

The agreement screen G120 illustrated in FIG. 8 includes a display field G121 in which the terms of use of the cloud cooperation print is displayed. After confirming the terms of use displayed in the display field G121, the user presses an agreement button G122 to agree to the terms of use, if the user agrees the terms of use.

When the user presses the agreement button G122, the UI control unit 301 transmits to the service provision system 10 information indicating that the user agrees to the terms of use (Step S702). Hereinafter, the information indicating that user agrees to the terms of use may be referred to as an agreement notification.

Upon receiving the agreement notification indicating that the user agrees to the terms of use, the authorization unit 102 of the service provision system 10 transmits to the external printing system 40 a request for a request token conforming to OAuth (Step S703). In response to the request for a request token, the external printing system 40 transmits a request token to the service provision system 10.

Subsequently, upon receiving the request token, the authorization unit 102 of the service provision system 10 transmits, to the terminal device 30, a Uniform Resource Locator (URL) of an authentication screen for the external printing system 40, for URL redirection (Step S704). Accordingly, the terminal device 30 displays an authentication screen G130 for the external printing system 40, as illustrated in FIG. 8, by the UI control unit 301.

The authentication screen G130 for the external printing system 40, which is illustrated in FIG. 8, includes an account ID entry field G131 for entering an account ID for the external printing system 40 and a password entry field G132 for entering a password corresponding to the account ID. When the user presses an OK button G133 after entering the account ID and the password in the account ID entry field G131 and the password entry field G132, respectively, the UI control unit 301 transmits a request for authentication to the external printing system 40 (Step S705). Hereinafter, the request for authentication may be referred to as an authentication request. The authentication request includes the account ID entered in the account ID entry field G131 and the password entered in the password entry field G132.

In response to the authentication request, an authentication process is performed in the external printing system 40 based on the authentication request. The authentication process is performed in the external printing system 40 by verifying whether a pair of the account ID and the password is valid or not, for example.

When a processing result of the authentication process is successful, the external printing system 40 transmits an authorization confirmation screen to the terminal device 30 to allow the user to approve an authorization request in relation to the service provision system 10. Accordingly, the terminal device 30 displays an authorization confirmation screen G140 as illustrated in FIG. 8, by the UI control unit 301.

The authorization confirmation screen G140 illustrated in FIG. 8 includes an approval button G141 for approving the authorization request in relation to the service provision system 10. When the user presses the approval button G141, the UT control unit 301 transmits a request for authorization (authorization request) to the external printing system 40 (Step S706). In response to the authorization request, the external printing system transmits an authorized request token to the terminal device 30.

Upon receiving the authorized request token from the external printing system 40, the UI control unit 301 of the terminal device 30 transmits the authorized request token to the service provision system 10 (Step S707).

Upon receiving the authorized request token, the authorization unit 102 of the service provision system 10 transmits the authorized request token to the external printing system 40 (Step S708). In response to the authorized request token received from the service provision system 10, the external printing system 40 transmits an access token to the service provision system 10. Through the above processing, the authorization process of authorizing the service provision system 10 for the registration to use the cloud print service in relation to the external printing system 40 is completed.

The registration unit 103 of the service provision system 10 transmits to the external printing system 40 a request for registration (registration request) to use the cloud print service using the access token acquired in Step S708 (Step S709). At this time, the registration unit 103 registers the service provision system 10 as an apparatus such as a printer to use the cloud print service. In other words, the registration unit 103 registers the service provision system 10 as a virtual printer to use the cloud print service. Hereinafter, the service provision system 10 registered to use the cloud print service is also referred to as a "virtual printer".

For example, when the cloud print service is Google Cloud Print, a printer name, a default display name, a proxy (or printer client), a manufacturer, and a model name are specified in the registration request. Accordingly, in the example of Google Cloud Print, the registration unit 103 transmits, to the external printing system 40, a registration request in which information indicating the service provision system 10 is specified.

Then, the external printing system 40 registers the service provision system 10 and transmits a registration result to the service provision system 10. The registration result includes, for example, a printer ID that identifies the printer that is registered in the external printing system 40, namely, the service provision system 10, which is registered as a virtual printer.

When performance information (for example, presence of a double-sided printing function, a color printing function, etc.) of the apparatus to use the cloud print service is required to be registered with the external printing system 40, performance information common to general printers may be registered as the performance information of the virtual printer.

Upon receiving the registration result from the external printing system 40, the registration unit 103 of the service provision system 10 generates a user ID (Step S710). For example, when a user ID is specified in the registration request received in Step S701, the registration unit 103 may not need to generate the user ID.

Subsequently, the registration unit 103 of the service provision system 10 associates the user ID with the account ID to be stored in the cooperation information table 111 (Step S711). That is, the registration unit 103 associates the user ID generated in Step S710 (or the user ID specified in the registration request received in Step S701) with the account ID entered in the account ID entry field G131 and stores the user ID and account ID in the cooperation information table 111 in association with each other.

Subsequently, the registration unit 103 of the service provision system 10 transmits, to the terminal device 30, a notification of registration completion. Hereinafter, the notification of registration completion may be referred to as a registration completion notification. The registration completion notification includes, for example, the printer ID identifying the virtual printer (i.e. the service provision system 10). The printer ID is stored in a predetermined storage area, such as the HDD 58, of the terminal device 30.

Through the processing described above, the registration process of registering to use the cloud cooperation print provided by the service provision system 10 according to the present embodiment is completed. In Step S701 of FIG. 7, when the user has already completed the registration process to use the cloud cooperation print (i.e. when the user ID is previously stored in the cooperation information table 111), a screen for selecting whether the user performs additional registration or not may be displayed.

Print Job Storing Process

Figure 9:
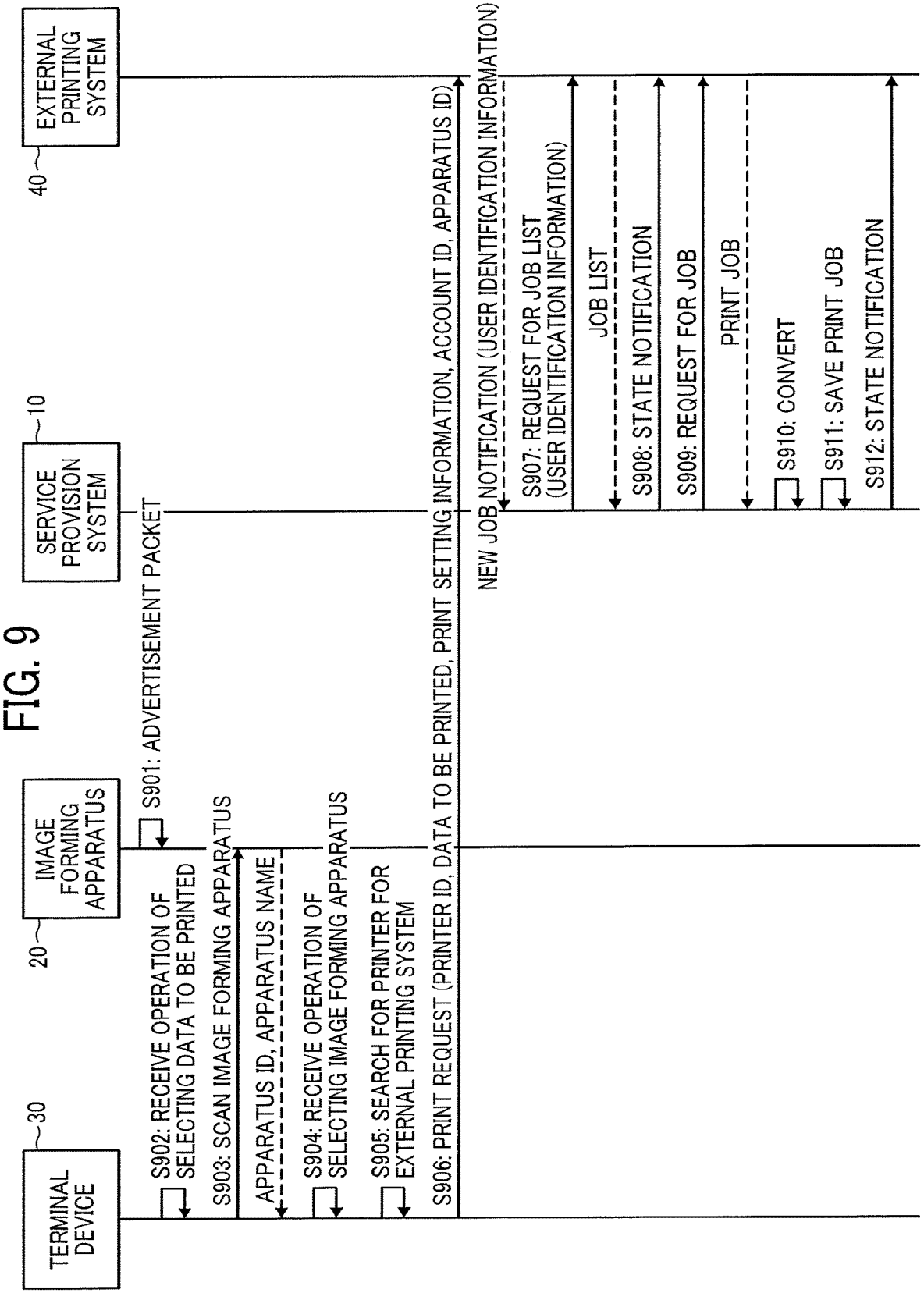
FIG. 9 is a sequence diagram illustrating an example of a print job storing process according to the first embodiment of the disclosure.
Figure 10:
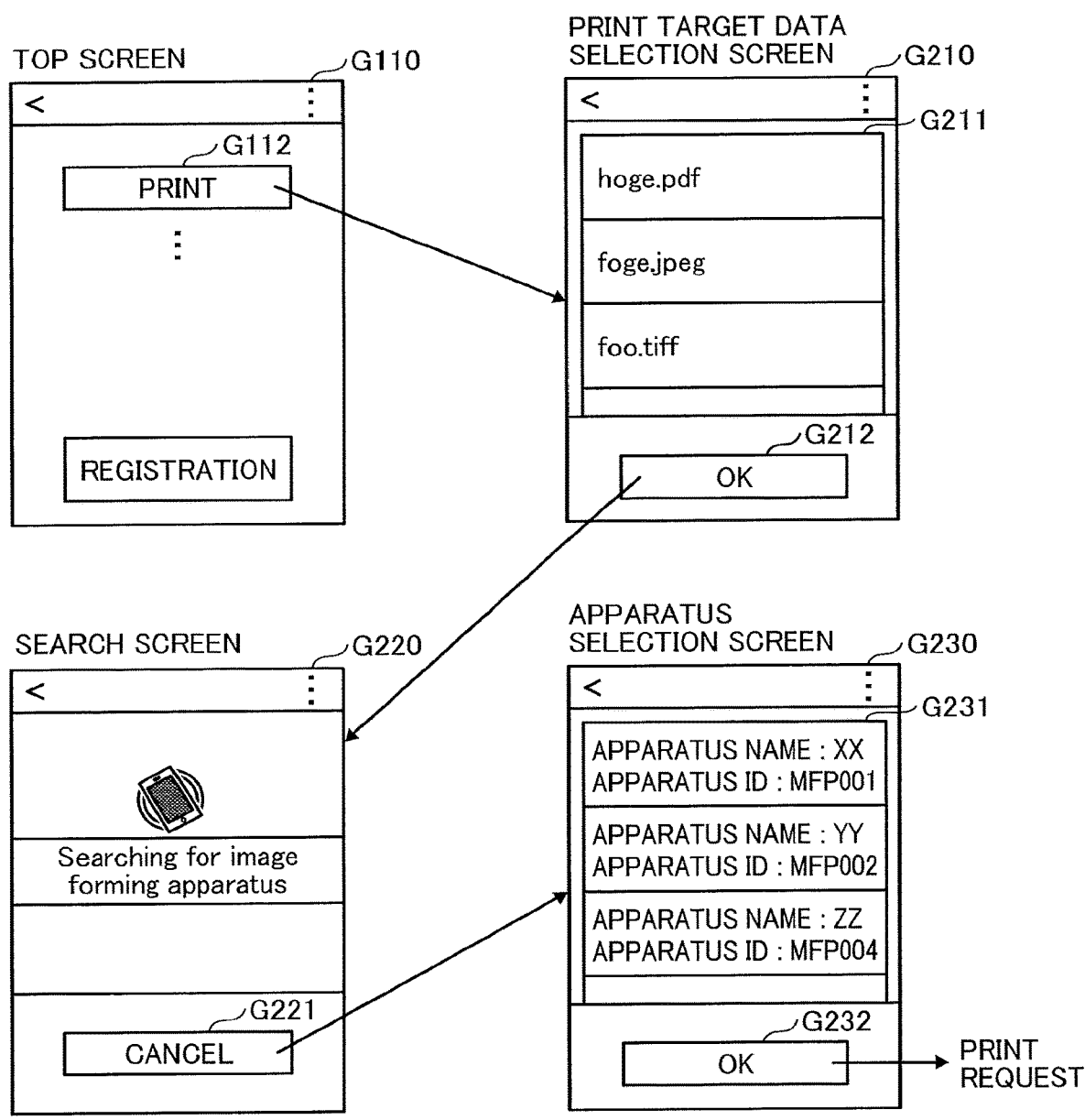
FIG. 10 is an illustration of an example of a screen transition of a terminal device in the job storing process according to the first embodiment of the disclosure.

A description is now given of a process of storing a print job, in which a print job is stored in the service provision system 10 when the user uses the terminal device 30 to execute printing using the cloud print service, with reference to FIG. 9 and FIG. 10. Hereinafter, the process of storing a print job may be referred to as a print job storing process.

FIG. 9 is a sequence diagram illustrating an example of the print job storing process according to the present embodiment. In the example of FIG. 9, Bluetooth is used as an example of the short-range wireless communication used by the terminal device 30 to receive the apparatus ID from the image forming apparatus 20. FIG. 10 is an illustration of an example of a screen transition of the terminal device 30 in the job storing process according to the present embodiment.

The apparatus ID transmission unit 202 of the image forming apparatus 20 advertises by transmitting a packet (advertisement packet) including the apparatus ID and the apparatus name, within a predetermined range around the image forming apparatus 20 (Step S901).

That is, each of the plurality of image forming apparatuses 20 including the image forming apparatus 20-1, the image forming apparatus 20-2, the image forming apparatus 20-3, and the like transmits the corresponding advertisement packet including the apparatus ID and the apparatus name by the apparatus ID transmission unit 202 to surroundings.

The UI control unit 301 of the terminal device 30 receives a user operation of selecting print target data (print target data selection operation) (Step S902). The user can perform the print target data selection operation by pressing an OK button G212 after selecting desired print target data from a print target data list G211 on a print target data selection screen G210, which is displayed by pressing a print button G112 on the top screen G110 illustrated in FIG. 10. In the print target data selection operation described above, the user may designate print settings (e.g. double-sided or single-sided, color or monochrome, etc.).

The apparatus ID reception unit 303 of the terminal device 30 scans the one or more image forming apparatuses 20 installed around the terminal device 30 (Step S903) and receives the apparatus ID and the apparatus name of each image forming apparatus 20. More specifically, when the print target data selection operation is performed, the apparatus ID reception unit 303 enters a scan mode and stays as the scan mode for a predetermined time of period, and the apparatus ID reception unit 303 acquires the apparatus ID and the apparatus name from the advertisement packet received during the scan mode.

While the apparatus ID reception unit 303 is in the scan mode, a search screen G220 illustrated in FIG. 10 is displayed on the terminal device 30 by the UI control unit 301. On the search screen G220 illustrated in FIG. 10, when the cancel button G221 is pressed by the user, the apparatus ID reception unit 303 cancels the scan mode (i.e. scanning the image forming apparatus 20 is canceled).

Upon completion of the scanning of the image forming apparatus 20 by the apparatus ID reception unit 303, the UI control unit 301 causes the terminal device 30 to display an apparatus selection screen G230 for selecting one of the one or more image forming apparatuses 20, as illustrated in FIG. 10. The apparatus selection screen G230 for selecting one of the one or more image forming apparatuses 20, illustrated in FIG. 10, displays a list G231 of the image forming apparatuses 20 of which apparatus IDs and apparatus names are received (i.e. the image forming apparatuses 20 which are around the terminal device 30).

The user can perform the apparatus selection operation of selecting one of the image forming apparatuses 20 by pressing an OK button G232 after selecting a desired one of the image forming apparatuses 20 from the list G231 of the image forming apparatuses 20.

The UI control unit 301 of the terminal device 30 receives the apparatus selection operation of selecting one of the image forming apparatuses 20 (Step S904). In response to reception of the apparatus selection operation, the printer ID acquisition unit 304 of the terminal device 30 searches for a printer ID for the cloud print service (Step S905). That is, the printer ID acquisition unit 304 searches the predetermined storage area such as the HDD 58 and acquires the printer ID that identifies the virtual printer (i.e. the service provision system 10).

Subsequently, the print request unit 302 of the terminal device 30 transmits a print request to the external printing system 40 (Step S906). The print request includes the printer ID (i.e. the printer ID of the virtual printer) acquired in Step S905, the print target data selected by the user, and the print setting information indicating the print settings of the print target data. The print request further includes the account ID of the user and the apparatus ID of the image forming apparatus 20 selected by the user.

Upon receiving the print request from the terminal device 30, the external printing system 40 generates a print job based on the print request and transmits, to the service provision system 10, a notification indicating that a print job is newly generated, for example. Hereinafter, the notification indicating that a print job is newly generated may be referred to as a new job notification. The new job notification includes the user identification information that identifies the user of the terminal device 30, which is a transmission source of the print request.

As the user identification information, any identification information may be used, as long as the user of the terminal device 30, which is a transmission source of the print request, can be identified between the service provision system 10 and the external printing system 40. In the present embodiment, as an example of the user identification information, an account ID is used.

In addition, the print job generated by the external printing system 40 includes, for example, a job ID for identifying a print job, a status of a print job, print data converted from the print target data, the print setting information, the account ID, and the apparatus ID.

Upon receiving the new job notification, the list acquisition unit 104 of the service provision system 10 transmits, to the external printing system 40, a request for a job list, for acquiring a print job associated with the account ID corresponding to the user identification information included in the new job notification (Step S907). Hereinafter, the request for a job list may be referred to as a job list acquisition request. In response to the job list acquisition request, the external printing system 40 transmits a job list to the service provision system 10. As described above, the job list includes, for example, a job ID, which identifies a print job, and a status of a print job.

Upon receiving the job list, the notification unit 105 of the service provision system transmits, to the external printing system 40, a state notification indicating a state of the service provision system 10 (e.g. "in process", "available for printing", etc.) (Step S908). In the example of FIG. 9, the notification unit 105 may transmit, to the external printing system 40, the state notification indicating that the service provision system 10 is "in process".

Then, the job acquisition unit 106 of the service provision system 10 transmits, to the external printing system 40, a print job acquisition request for acquiring a print job having a status of "unprocessed" in the job list acquired in the above-described Step S907 (Step S909). In response to the print job acquisition request, the external printing system 40 transmits a print job according to the print job acquisition request (i.e. a print job having a status of "unprocessed").

When there are plural print jobs each of which has a status of "unprocessed" in the job list, which is acquired in the above-described Step S907, the job acquisition unit 106 transmits, to the external printing system 40, the print job acquisition request for acquiring the plurality of print jobs in Step S909.

Subsequently, the print conversion unit 107 of the service provision system 10 converts print data included in the print job acquired by the job acquisition unit 106 into a data format suitable for executing printing with the image forming apparatus 20 (Step S910). When the print data included in the print job acquired by the job acquisition unit 106 is in the data format suitable for executing printing with the image forming apparatus 20, the print conversion unit 107 does not need to convert the data format.

For example, when the data format of the print data included in the print job is in a data format with which the image forming apparatus 20 is not able to execute printing, the print conversion unit 107 converts the data format of the print data into a data format with which the image forming apparatus 20 is able to execute printing. In addition, for example, if it becomes possible to print the print data at a speed higher than a current speed using the image forming apparatus 20 by converting the print data, the print conversion unit 107 converts the data format of the print data into a predetermined data format.

Subsequently, the job management unit 108 of the service provision system 10 stores the print job in the job storage unit 120 (Step S911). As a result, the print job 121 is stored in the job storage unit 120.

In addition, the print job 121 may be stored in the job storage unit 120 in association with a job status indicating the execution status of the print job 121 in the service provision system 10, for example. In addition, the print job 121 may be stored in the job storage unit 120 in association with the user ID for identifying the user of the terminal device 30, which is a transmission source of the print request.

Subsequently, the notification unit 105 of the service provision system 10 transmits a state notification indicating a state of the service provision system 10 to the external printing system 40 (Step S912). In the example of FIG. 9, the notification unit 105 may transmit, to the external printing system 40, the state notification indicating the service provision system is "available for printing". As described above, the service provision system 10 according to the present embodiment notifies the external printing system 40 that the service provision system 10 is "in process" during a time of period from when receiving a print job to when saving the print job. In addition, the service provision system 10 according to the present embodiment notifies the external printing system 40 that service provision system 10 is "available for printing" after saving the print job.

As described above, the service provision system 10 according to the present embodiment stores a print job for the cloud print service provided by the external printing system 40. In addition, in storing the print job in the service provision system 10 according to the present embodiment, the print job includes an apparatus ID identifying the image forming apparatus 20 selected by the user. As a result, as will be described later, the image forming apparatus 20 identified by the apparatus ID is able to execute printing of the print job.

In the example of FIG. 9, the apparatus selection operation of selecting the image forming apparatus 20 is performed by the user (Step S904) after the print target data selection operation of selecting the print target data (Step S902), but this order may be reversed. That is, the terminal device 30 may display the print target data selection screen G210 after the apparatus selection screen G230 for selecting one of the image forming apparatuses 20.

In the example described above, the UI control unit 301 searches for the printer ID of the virtual printer in Step S905 of FIG. 9. Alternatively, the UI control unit 301 can display a printer ID list and the user may select the printer ID from the printer ID list displayed, for example. This allows the user to select a printer ID for using a usual cloud print service (e.g. Google Cloud Print) instead of the cloud cooperation print, for example.

However, in a case where a printer ID for using a usual cloud print service (e.g. Google Cloud Print) is selected, the apparatus selection screen G230 for selecting the image forming apparatus 20 is not preferably to be displayed because the printing is to be executed using a printer identified by the selected printer ID.

In addition, in the example of FIG. 9 described above, the external printing system issues the new job notification.

However, the embodiments of the disclosure are not limited to this, and there is a case where such a new job notification is not issued depending on the external printing system 40. In this case, the service provision system 10 may acquire a print job by, for example, polling the external printing system 40 at predetermined time intervals.

Print Execution Process

Figure 11:
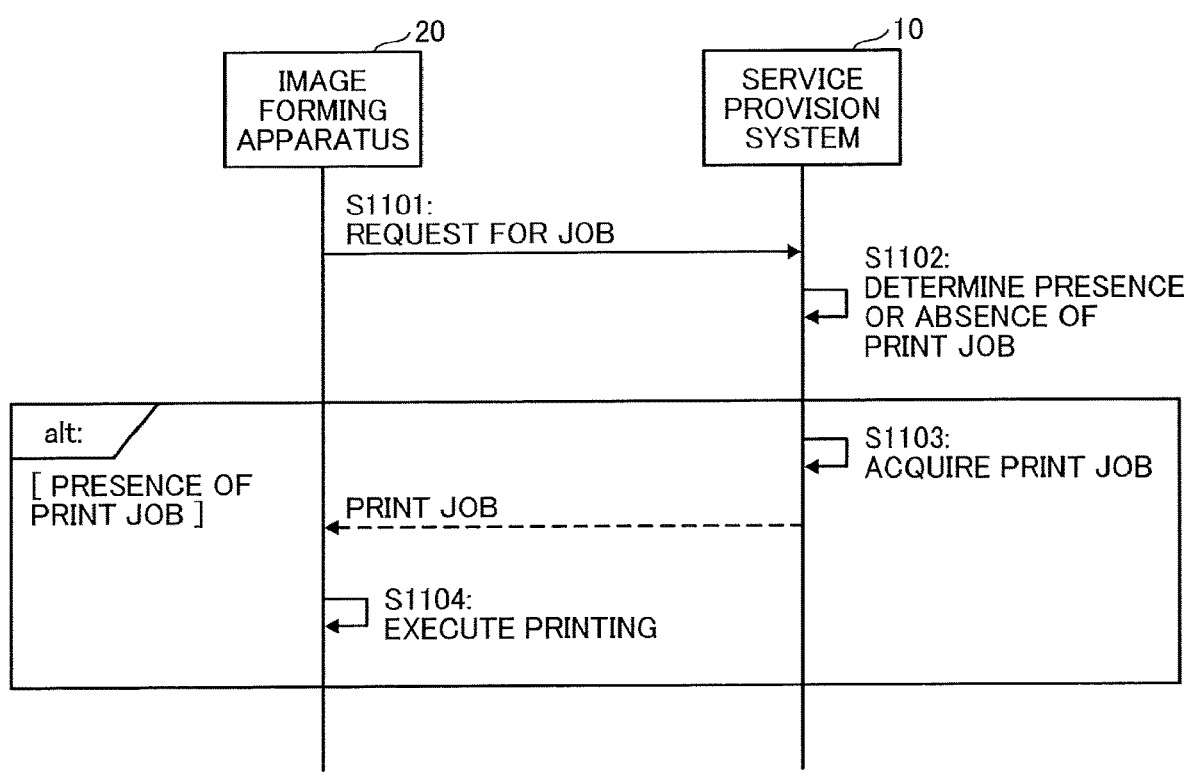
FIG. 11 is a sequence diagram illustrating an example of a print execution process according to one of the embodiments of the disclosure.

A description is now given of a process of executing printing of print data included in a print job, performed by the image forming apparatus 20, with reference to FIG. 11. Hereinafter, the process of executing printing of print data included in a print job may be referred to as a print execution process.

FIG. 11 is a sequence diagram illustrating an example of the print execution process according to the present embodiment.

The job monitoring unit 203 of the image forming apparatus 20 transmits a request for a job (job acquisition request) to the service provision system 10 at predetermined time intervals, which may be set by a designer or a user, for example (Step S1101). For example, the user may select predetermined time intervals from among options set in advance. In addition, the predetermined time intervals may be, for example, every one minute or every several seconds, which are determined when the related system is designed. The job acquisition request includes the apparatus ID of the image forming apparatus 20.

Upon receiving the job acquisition request, the job management unit 108 of the service provision system 10 determines whether the print job 121 associated with the apparatus ID, which is included in the job acquisition request is stored in the job storage unit 120 or not (Step S1102).

When the determination indicates that the print job 121 associated with the apparatus ID is stored in the job storage unit 120, the job management unit 108 acquires the print job 121 associated with the apparatus ID from the job storage unit 120 (Step S1103). When plural print jobs 121, which are associated with the apparatus ID are stored in the job storage unit 120, the job management unit 108 may acquire the plural print jobs 121 from the job storage unit 120.

Then, the job management unit 108 of the service provision system 10 transmits the print job 121 acquired from the job storage unit 120 to the image forming apparatus 20 that is a transmission source of the job acquisition request.

Upon receiving the print job 121, the print processing unit 204 of the image forming apparatus 20 executes the print job 121 and prints the print data included in the print job 121 (Step S1104). As a result, the print job 121 is executed in the image forming apparatus 20, and the print data is printed.

As described above, in the printing system 1 according to the present embodiment, printing is executed by the image forming apparatus 20 selected by the user. As described above, in the printing system 1 according to the present embodiment, by using the cloud cooperation print provided by the service provision system 10, the image forming apparatus that is not registered in the cloud print service can be used to execute printing. In addition, the user can execute printing with the desired image forming apparatus 20 selected from the one or more image forming apparatuses 20 installed near the user by short-distance wireless communication such as Bluetooth.

In addition, the cloud cooperation print provided by the service provision system 10 according to the present embodiment can coexist with a so-called "location free print service". The location free print service is a service with which an apparatus ID is not included in a print request, which is, for example, received in Step S906 of FIG. 9. Accordingly, any one of the one or more image forming apparatuses 20 can acquire a print job stored in the service provision system 10 and execute the print job.

Modification of Print Job Storing Process

Figure 12:
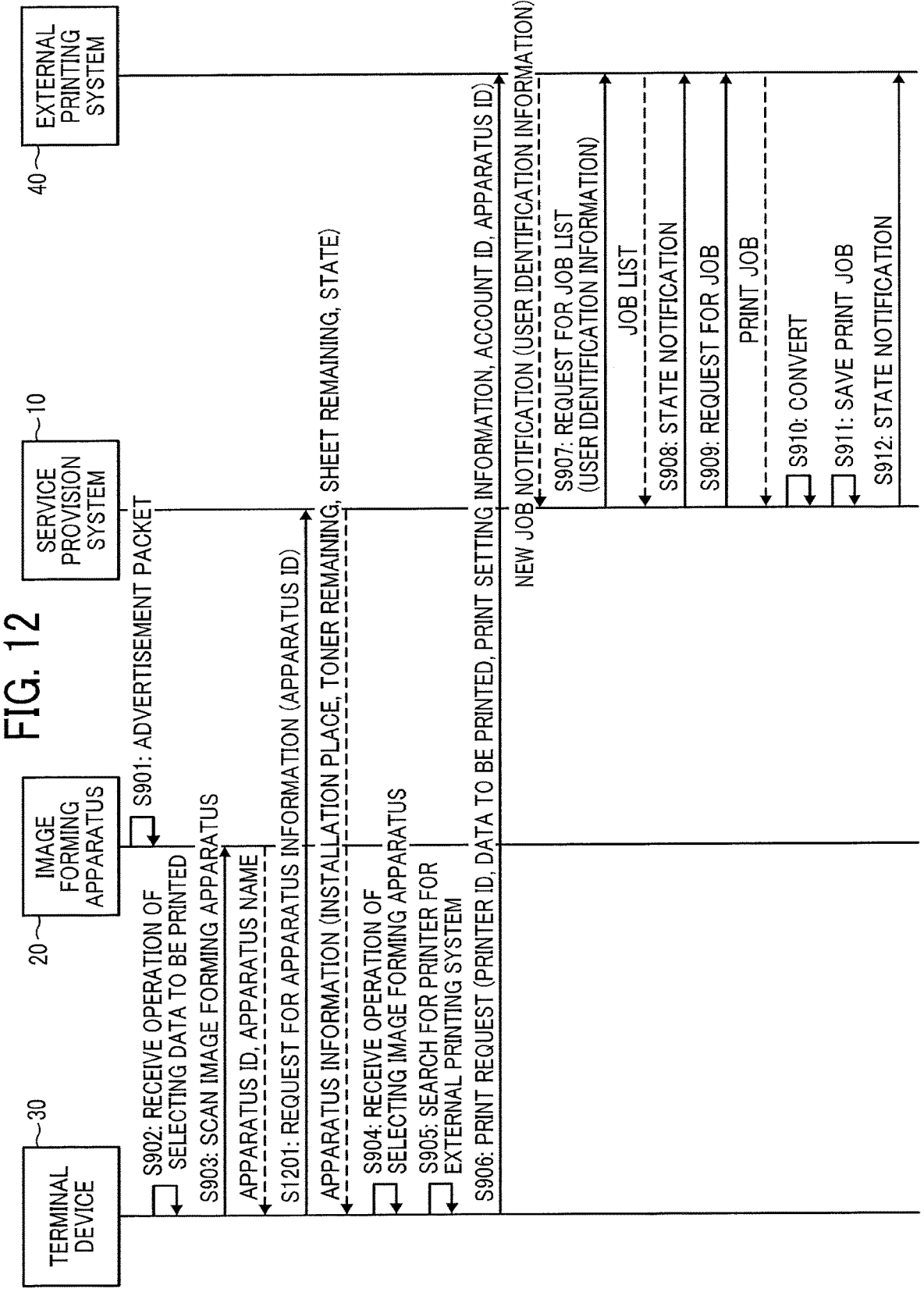
FIG. 12 is a sequence diagram illustrating a modification of the print job storing process according to the first embodiment of the disclosure.

A description is now given of a modification of the print job storing process, which is described above with reference to FIG. 9, with reference to FIG. 12.

FIG. 12 is a sequence diagram illustrating the modification of the print job storing process according to the present embodiment. Processing of Steps from S901 to S912 of FIG. 12 is substantially the same as that of FIG. 9 and a description of the processing is omitted here.

Subsequent to Step S903, when the scanning of the image forming apparatus 20 performed by the apparatus ID reception unit 303 is completed, the UI control unit 301 of the terminal device 30 transmits a request for apparatus information to the service provision system 10 (Step S1201). Hereinafter, the request for apparatus information may be referred to as an apparatus information acquisition request. The apparatus information acquisition request includes the apparatus ID received by the apparatus ID reception unit 303.

In response to the apparatus information acquisition request received from the terminal device 30, the service provision system 10 transmits apparatus information associated with the apparatus ID, which is included in the apparatus information acquisition request. The apparatus information includes, for example, information indicating where the image forming apparatus 20 is installed (installation place), how much an amount of toner remains (toner remaining), how many sheets of paper remains (sheet remaining), and a state of the apparatus (e.g. "in operation", "in out of order", etc.). Such apparatus information is collected form each image forming apparatus 20 at predetermined intervals by service provision system 10 and stored in a predetermined storage area such as HDD 58, for example. For example, the user may select predetermined time intervals from among options set in advance. In addition, the predetermined time intervals may be, for example, every one minute or every several seconds, which are determined when the related system is designed.

Figure 13:
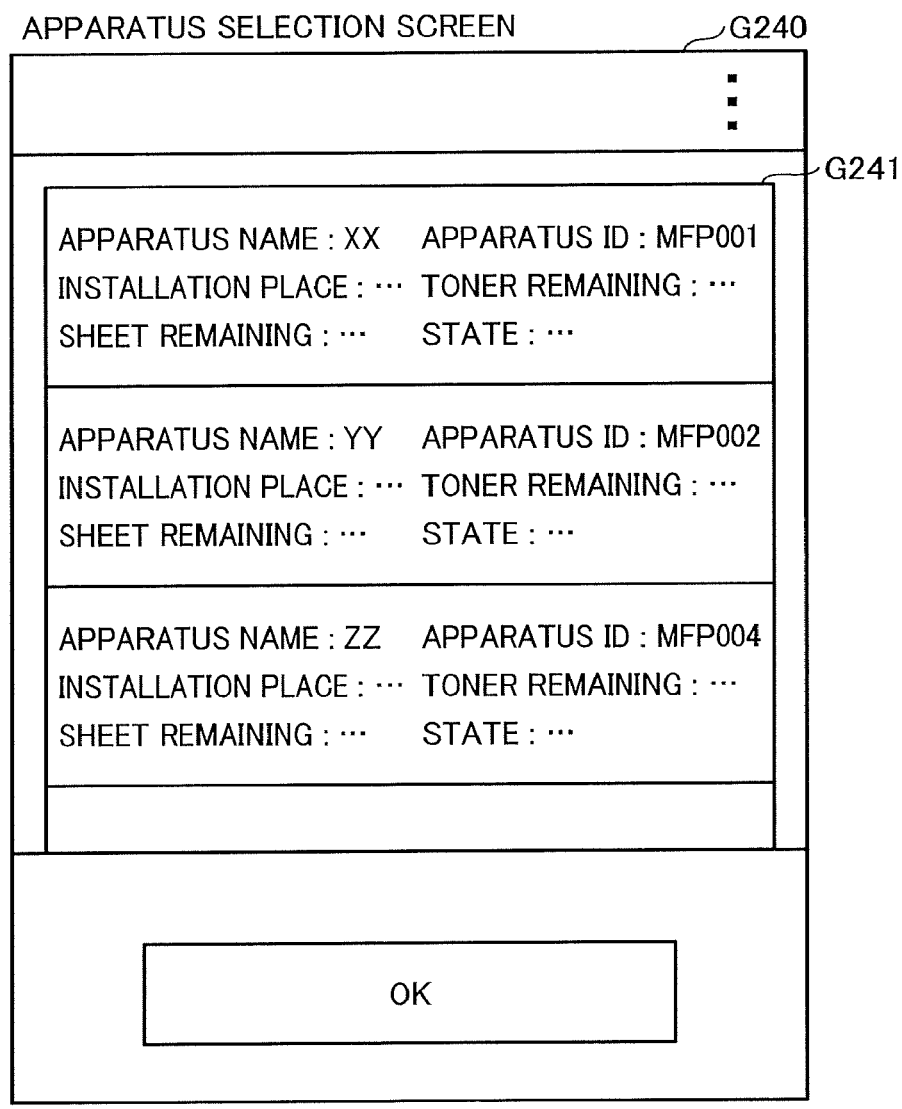
FIG. 13 is an illustration of an example of an apparatus selection screen for selecting an image forming apparatus, according to one of the embodiments of the disclosure.

When receiving the apparatus information from the service provision system 10, the terminal device 30 displays an apparatus selection screen G240, as illustrated in FIG. 13 for selecting one of the one or more image forming apparatus 20 by the UI control unit 301. FIG. 13 is an illustration of an example of the apparatus selection screen G240 for selecting one of the image forming apparatuses 20, according to the present embodiment. On the apparatus selection screen G240 for selecting one of the one or more image forming apparatuses 20 illustrated in FIG. 13, a list G241 of the image forming apparatuses 20 is displayed. The list G241 includes the apparatus ID and each pieces of information included in the apparatus information (e.g. information indicating where the image forming apparatus is installed (installation place), how much an amount of toner remains (toner remaining), how many sheets of paper remains (sheet remaining), and a state of the apparatus).

By displaying, in the list G241 of the image forming apparatuses 20, the information indicating where each image forming apparatus 20 is installed (installation place), the user can select the image forming apparatus 20 that is the closest among the one or more image forming apparatuses 20. In addition, by displaying, in the list G241 of the image forming apparatuses 20, the information indicating how much an amount of toner remains (tonner remaining), how many sheets of paper remains (sheet remaining), a state of the apparatus, etc., for each image forming apparatus 20, the user can selects the image forming apparatus that has enough toner or sheets of paper, or that is not out of order, for example.

Second Embodiment

A description is now given of a second embodiment. In the second embodiment, associating the apparatus ID of the image forming apparatus 20 selected by the user among the image forming apparatuses 20 installed around the user with a virtual printer registered in the external printing system 40 is described. By associating the information mentioned above, the user can use the image forming apparatus 20 corresponding to a desired virtual printer selected by the user from a plurality of virtual printers, in executing printing using the terminal device 30.

In the following description of the second embodiment, differences from the first embodiment are mainly described, and a description of components, which are substantially the same as those in the first embodiment, is appropriately omitted or simplified.

Functional Configuration

Figure 14:
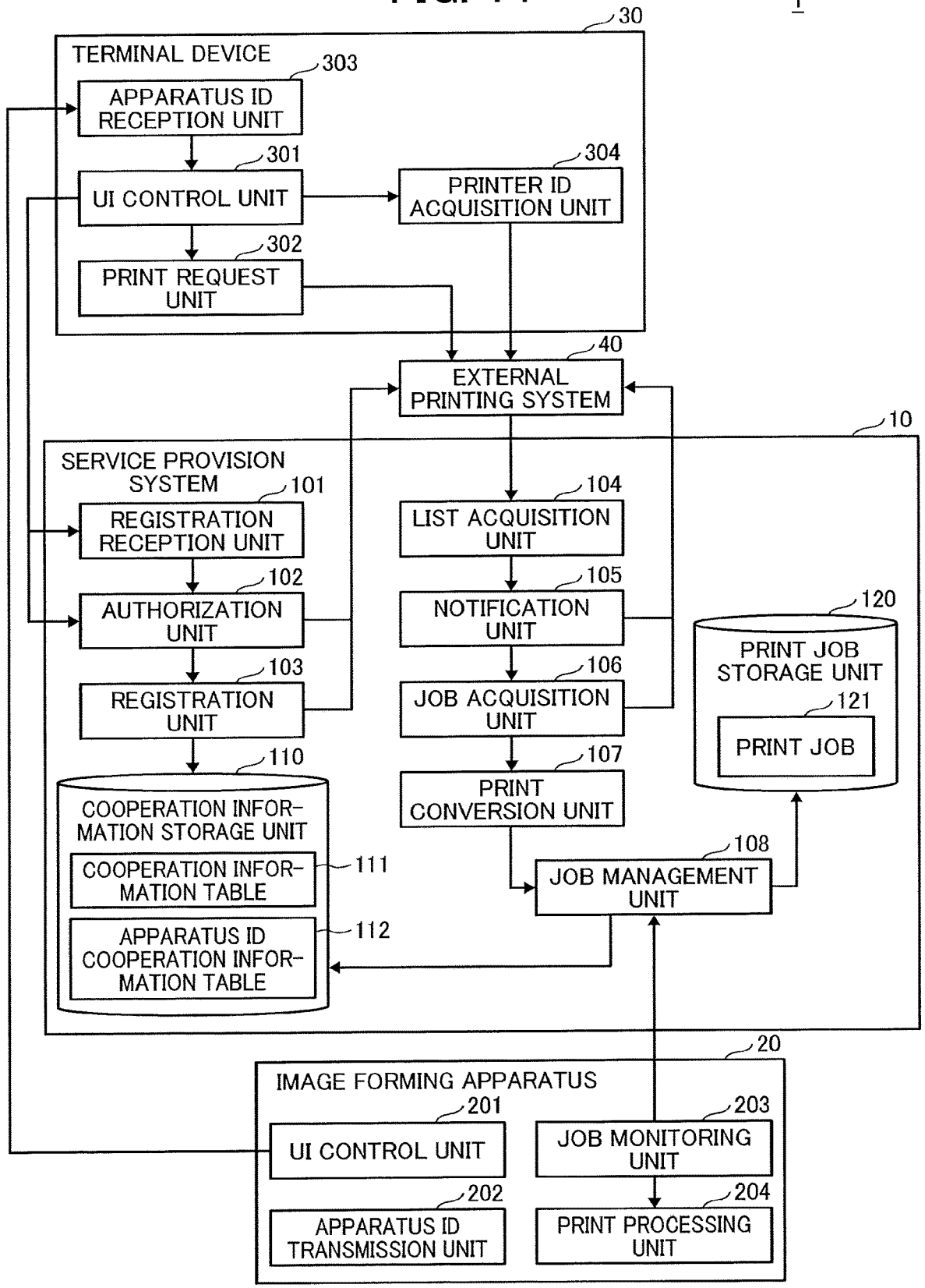
FIG. 14 is a block diagram illustrating an example of a functional configuration of a printing system according to a second embodiment of the disclosure.

A description is now given of a functional configuration of the printing system 1 according to the present embodiment, with reference to FIG. 14.

FIG. 14 is a block diagram illustrating an example of a functional configuration of the printing system 1 according to the present embodiment.

The cooperation information storage unit 110 of the service provision system 10 stores an apparatus ID cooperation information table 112 in which a printer ID of a virtual printer and an apparatus ID are associated with each other.

Figure 15:
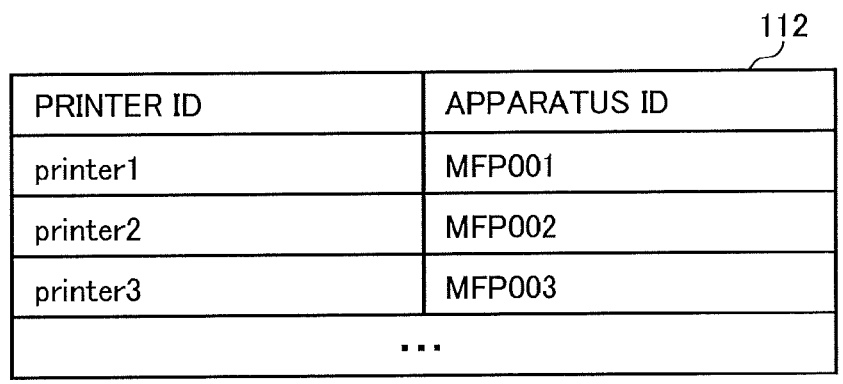
FIG. 15 is a conceptual diagram illustrating an example of an apparatus identifier (ID) cooperation information table, according to one of the embodiments of the disclosure.

A description is now given of the apparatus ID cooperation information table 112, with reference to FIG. 15.

FIG. 15 is a conceptual diagram illustrating an example of the apparatus ID cooperation information table 112, according to the present embodiment.

The apparatus ID cooperation information table 112 illustrated in FIG. 15 has data items of "Printer ID" and "Apparatus ID". The data item of "Printer ID" is an identifier, or identification information, for identifying a virtual printer. The data item of "Apparatus ID" is an identifier, or identification information, for identifying the image forming apparatus 20.

As described above, in the apparatus ID cooperation information table 112, the printer ID and the apparatus ID are associated with each other. In addition, as described above, a printer ID identifies a virtual printer on the external printing system 40. Accordingly, when initial settings differ depending on a user or a department and when a virtual printer is generated for each user account, plural printer IDs may be associated with a single apparatus ID, for example.

Operation

A detailed description is now given of operation performed by the printing system 1 according to the present embodiment. A print execution process according to the present embodiment is substantially the same as that in the first embodiment and a description of the print execution process is omitted here.

Registration Process

Figure 16:
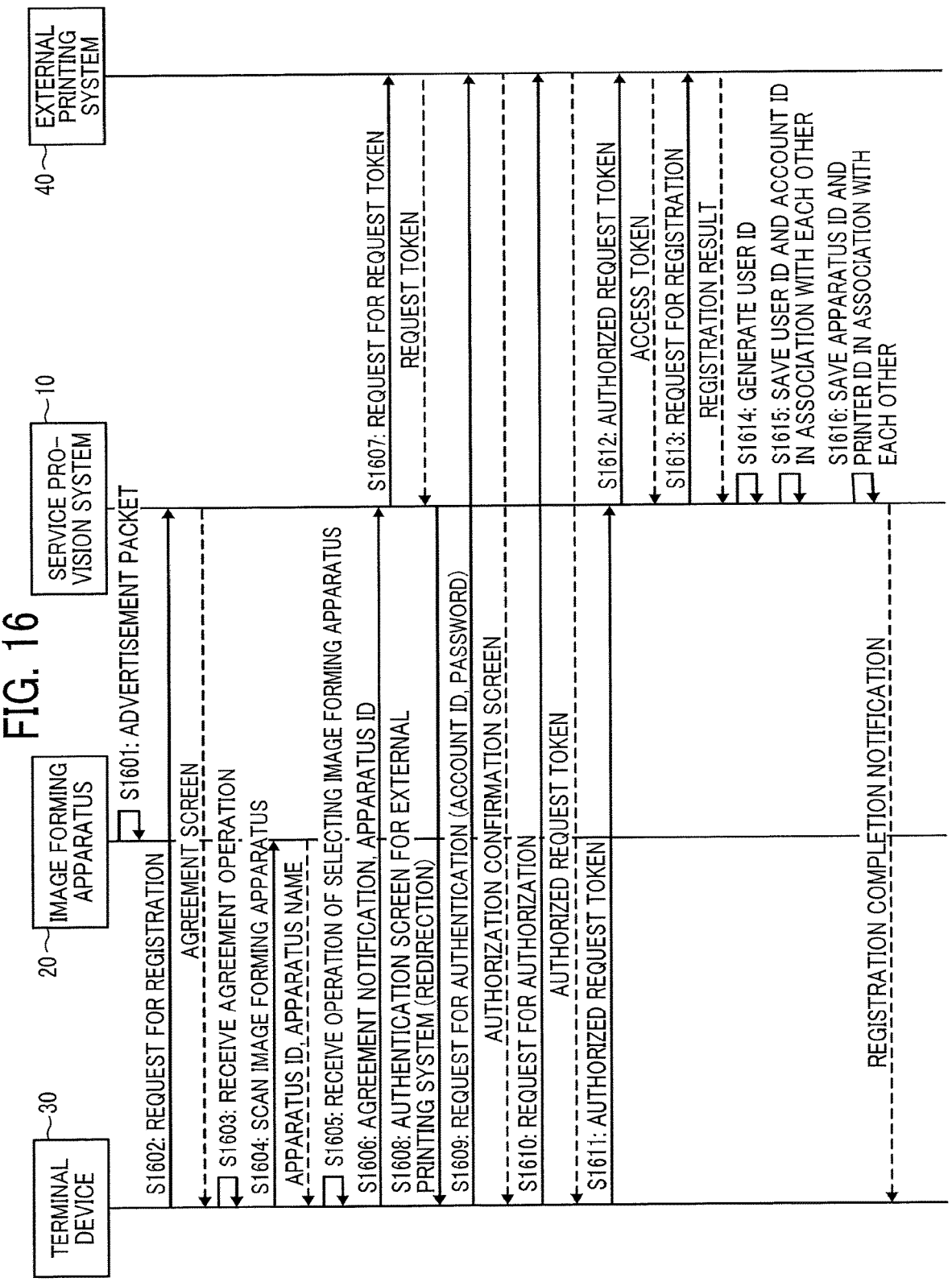
FIG. 16 is a sequence diagram illustrating an example of a registration process of registering to use a cloud cooperation print, according to the second embodiment of the disclosure.
Figure 17:
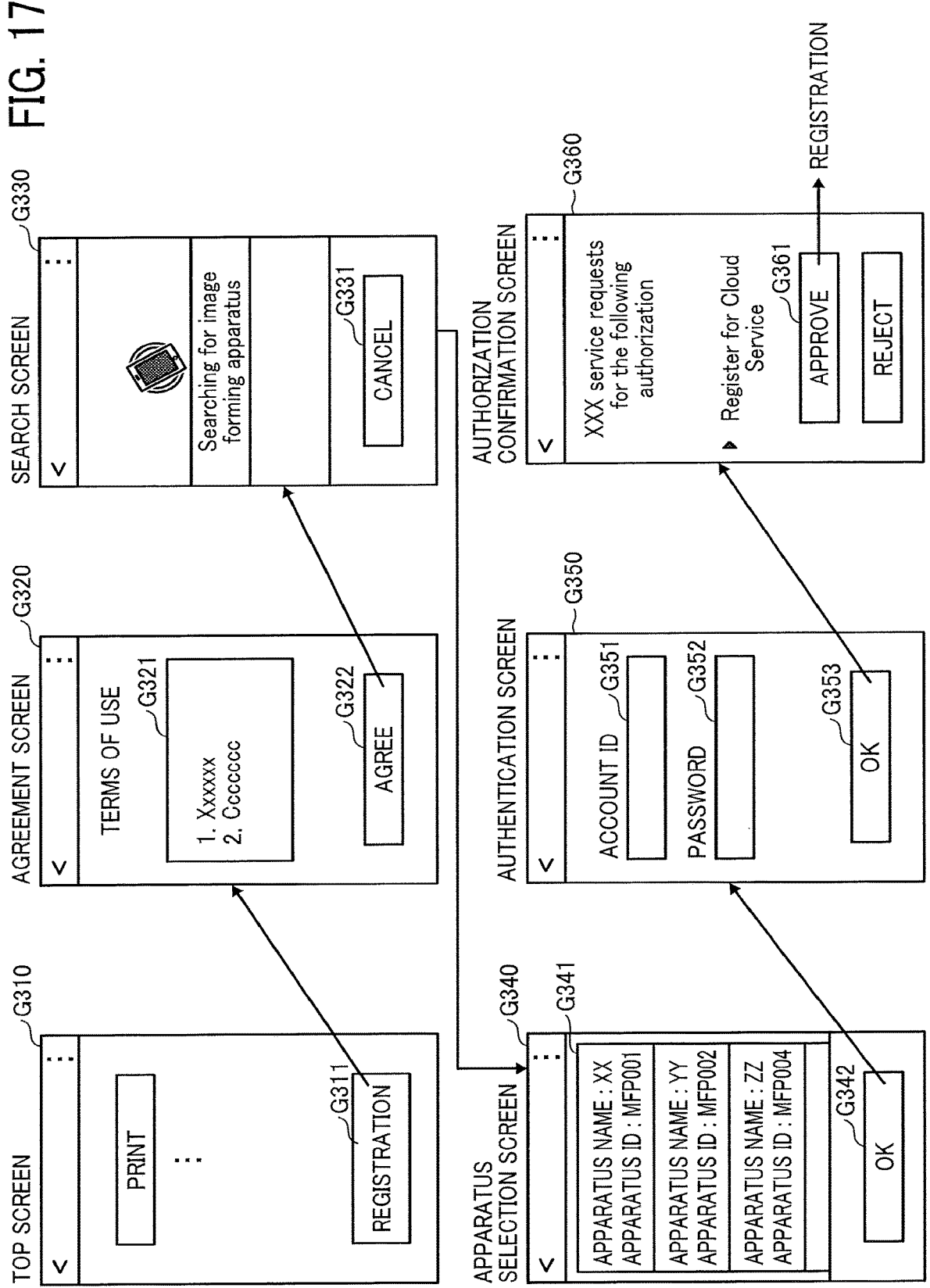
FIG. 17 is an illustration of an example of a screen transition of a terminal device in the registration process according to the second embodiment of the disclosure.

A description is now given of a registration process in which a user uses the terminal device 30 to register to use the cloud cooperation print, with reference to FIG. 16 and FIG. 17.

FIG. 16 is a sequence diagram illustrating an example of the registration process of registering to use the cloud cooperation print, according to the present embodiment.

FIG. 17 is an illustration of an example of a screen transition of the terminal device 30 in the registration process according to the present embodiment.

The apparatus ID transmission unit 202 of the image forming apparatus 20 advertises by transmitting an advertisement packet including the apparatus ID and the apparatus name, within a predetermined range around the image forming apparatus 20 (Step S1601).

In addition, it is assumed that a top screen G310 as illustrated in FIG. 17 is displayed on the terminal device 30 by the UI control unit 301. When the user presses a registration button G311, the UI control unit 301 transmits a request for registration (registration request) to the service provision system 10 (Step S1602).

In response to the registration request, the registration reception unit 101 of the service provision system 10 transmits an agreement screen to the terminal device 30. Accordingly, an agreement screen G320 as illustrated in FIG. 17 is displayed on the terminal device 30 by the UI control unit 301.

After confirming the terms of use displayed in a display field G321, the user presses an agreement button G322 to agree to the terms of use if the user agrees to the terms of use. When the user performs an operation for the agreement, the UI control unit 301 receives the operation for the agreement (Step S1603). Hereinafter, the operation for the agreement, namely pressing the agreement button G322, may be referred to as an agreement operation.

When the UI control unit 301 receives the agreement operation, the apparatus ID reception unit 303 of the terminal device 30 scans the one or more image forming apparatuses installed around the terminal device 30 (Step S1604) and receives the apparatus ID and the apparatus name of each image forming apparatus 20.

While the apparatus ID reception unit 303 is in a scan mode, a search screen G330 illustrated in FIG. 17 is displayed on the terminal device 30 by the UI control unit 301. In a case where a cancel button G331 is pressed, the apparatus ID reception unit 303 cancels the scan mode.

Upon completion of the scanning of the image forming apparatus 20 by the apparatus ID reception unit 303, the UI control unit 301 causes the terminal device 30 to display a selection screen G340 for selecting one of the one or more image forming apparatuses 20, as illustrated in FIG. 17.

The user can perform an apparatus selection operation of selecting one of the image forming apparatuses 20 by pressing an OK button G342 after selecting a desired one of the image forming apparatuses 20 from a list G341 of the image forming apparatuses 20.

The UI control unit 301 of the terminal device 30 receives the apparatus selection operation of selecting one of the image forming apparatuses 20 (Step S1605). Subsequently, the UI control unit 301 of the terminal device 30 transmits, to the service provision system 10, information (agreement notification) indicating that the user agrees to the terms of use and an apparatus ID of the image forming apparatus 20 that is selected by the user (Step S1606).

Upon receiving the information (agreement notification) indicating that the user agrees to the terms of use and the apparatus ID, the authorization unit 102 of the service provision system 10 transmits, to the external printing system 40, a request for a request token conforming to OAuth (Step S1607). In response to the request for a request token, the external printing system 40 transmits a request token to the service provision system 10.

Subsequently, upon receiving the request token, the authorization unit 102 of the service provision system 10 transmits a URL of an authentication screen for the external printing system 40, for URL redirection, to the terminal device 30 (Step S1608). Accordingly, the terminal device 30 displays an authentication screen G350 for the external printing system 40, as illustrated in FIG. 17, by the UI control unit 301.

In the example here, the user presses an OK button G353 after entering an account ID and a password corresponding to the account ID in the account ID entry field G351 and the password entry field G352, respectively, on the authentication screen G350 for the external printing system 40, which is illustrated in FIG. 17. The UI control unit 301 transmits a request for authentication (authentication request) to the external printing system 40 (Step S1609). The authentication request includes the account ID entered in the account ID entry field G351 and the password entered in the password entry field G352.

In response to the authentication request, an authentication process is performed in the external printing system 40 based on the authentication request. When a processing result of the authentication process is successful, the external printing system 40 transmits an authorization confirmation screen to the terminal device 30. Accordingly, the terminal device 30 displays an authorization confirmation screen G360 as illustrated in FIG. 17, by the UI control unit 301.

When the user presses an approve button G361 on the authorization confirmation screen G360 illustrated in FIG. 17, the UI control unit 301 transmits a request for authorization (authorization request) to the external printing system 40 (Step S1610). In response to the authorization request, the external printing system 40 transmits an authorized request token to the terminal device 30.

Upon receiving the authorized request token from the external printing system 40, the UI control unit 301 of the terminal device 30 transmits the authorized request token to the service provision system 10 (Step S1611).

Upon receiving the authorized request token, the authorization unit 102 of the service provision system 10 transmits the authorized request token to the external printing system 40 (Step S1612). In response to the authorized request token, the external printing system 40 transmits an access token to the service provision system 10. Through the above processing, the authorization process of authorizing the service provision system 10 for the registration to use the cloud print service in relation to the external printing system 40 is completed.

The registration unit 103 of the service provision system 10 transmits to the external printing system 40 a request for registration (registration request) to use the cloud print service using the access token acquired in Step S1612 (Step S1613). When the apparatus ID of the image forming apparatus 20 selected by the user can be specified, the registration unit 103 registers the service provision system 10 as a virtual printer after specifying the apparatus ID.

For example, when the cloud print service is Google Cloud Print, a tag can be specified in the registration request in addition to a printer name, a default display name, a proxy (or printer client), a manufacturer, and a model name. Accordingly, in the example of Google Cloud Print, the registration unit 103 transmits, to the external printing system 40, a registration request in which the printer name, the default display name, the proxy (or printer client), the manufacturer, and the model name are specified to indicate the service provision system 10, along with the tag with which the apparatus ID is associated.

In the following description of the present embodiment, an example case where the registration unit 103 registers the service provision system 10 as a virtual printer without specifying an apparatus ID is given.

When registering the service provision system 10, the external printing system 40 transmits a registration result to the service provision system 10. The registration result includes, for example, a printer ID identifying the printer that is registered in the external printing system 40, namely, the service provision system 10 registered as a virtual printer for each apparatus ID.

Upon receiving the registration result from the external printing system 40, the registration unit 103 of the service provision system 10 generates a user ID (Step S1614).

Subsequently, the registration unit 103 of the service provision system 10 stores the user ID and the account ID in the cooperation information table 111 in association with each other (Step S1615).

Subsequently, the registration unit 103 of the service provision system 10 associates the printer ID with the apparatus ID and stores the printer ID and the apparatus ID in the apparatus ID cooperation information table 112 (Step S1616). That is, the registration unit 103 stores the printer ID of the virtual printer registered in the external printing system 40 and the apparatus ID of the image forming apparatus 20 selected by the user in the apparatus ID cooperation information table 112 in association with each other. In addition, as described above, a plurality of printer IDs may be associated with a single apparatus ID.

Subsequently, the registration unit 103 of the service provision system 10 transmits, to the terminal device 30, a notification of registration completion. Hereinafter, the notification of registration completion may be referred to as a registration completion notification. The registration completion notification includes, for example, the printer ID. The printer ID is stored in a predetermined storage area such as the HDD 58 of the terminal device 30.

Through the processing described above, the registration process to use the cloud cooperation print provided by the service provision system 10 according to the present embodiment is completed. In the registration process according to the present embodiment, a virtual printer for each apparatus ID of the image forming apparatus 20 selected by the user is registered in the external printing system 40. Thereby, as described later, by merely selecting a virtual printer, the user can execute printing with the image forming apparatus 20 having the apparatus ID corresponding to the virtual printer.

Print Job Storing Process

Figure 18:
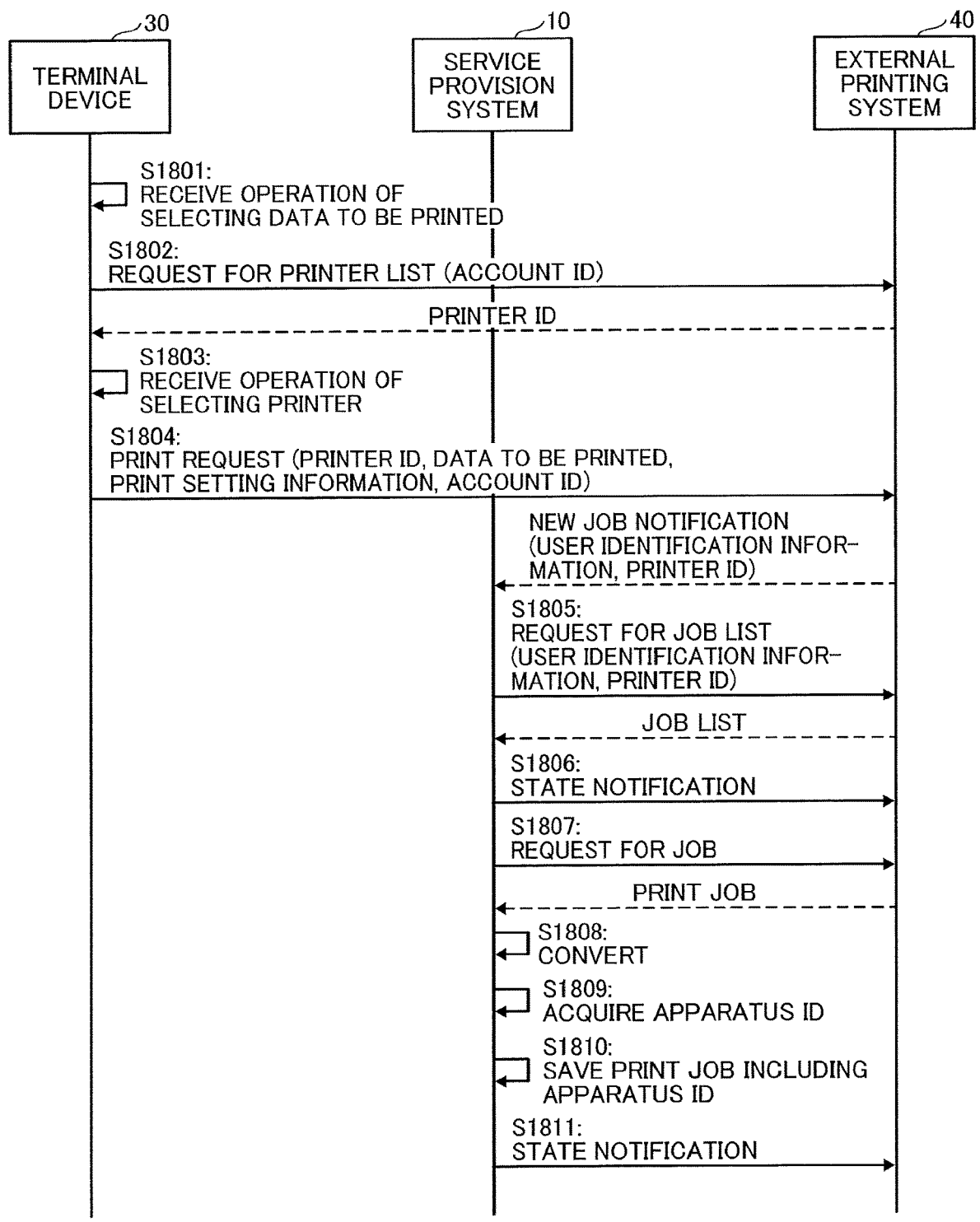
FIG. 18 is a sequence diagram illustrating an example of a print job storing process according to the second embodiment of the disclosure.
Figure 19:
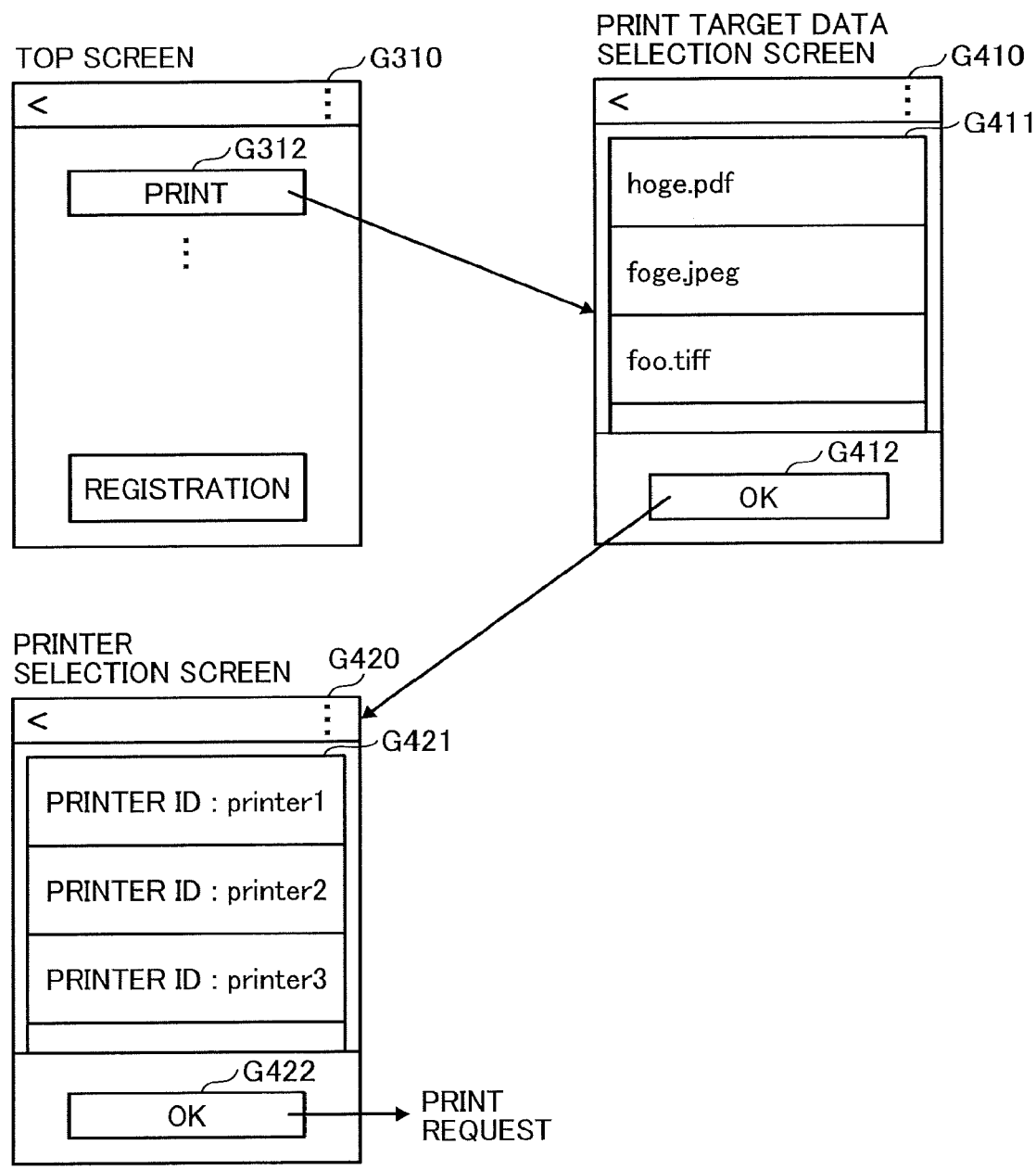
FIG. 19 is an illustration of an example of a screen transition of a terminal device in the job storing process according to the second embodiment of the disclosure.

A description is now given of a print job storing process, in which a print job is stored in the service provision system 10 when the user uses the terminal device 30 to execute printing using the cloud print service, with reference to FIG. 18 and FIG. 19.

FIG. 18 is a sequence diagram illustrating an example of the print job storing process according to the present embodiment. FIG. 19 is an illustration of an example of a screen transition of the terminal device 30 in the job storing process according to the present embodiment.

It is assumed that the top screen G310 as illustrated in FIG. 19 is displayed on the terminal device 30 by the UI control unit 301. The user can perform an operation of selecting data to be printed (print target data selection operation) by pressing an OK button G412 after selecting desired print target data from a print target data list G411 displayed on a print target selection screen G410. The print target selection screen G410 is displayed by pressing a print button G312 on the top screen G310 illustrated in FIG. 19.

The UI control unit 301 of the terminal device 30 receives a print target data selection operation (Step S1801). Subsequently, the printer ID acquisition unit 304 of the terminal device 30 transmits a request for a printer list (printer list acquisition request) to the external printing system 40 (Step S1802). The request for a virtual printer list includes the account ID of the user.

Upon receiving the printer list acquisition request, the external printing system 40 transmits one or more printer IDs each of which identifies a printer corresponding to the account ID included in the printer list acquisition request.

When the terminal device 30 receives the one or more printer IDs transmitted from the external printing system 40, the terminal device 30 displays a printer selection screen G420 as illustrated in FIG. 19 by the UI control unit 301. The printer selection screen G420 illustrated in FIG. 19 includes a printer list G421 in which printers that are identified by the printer IDs transmitted from the external printing system 40, namely, printers that are registered in the external printing system 40 in advance, are listed.

The user can perform an operation of selecting a printer by pressing an OK button G422 after selecting a desired printer from the printer list G421. Hereinafter, the operation of selecting a printer may be referred to as a printer selection operation. In the example described below, a printer that is registered as a virtual printer is selected from the printer list G421.

In Step S1802 described above, the printer IDs are acquired by transmitting the printer list acquisition request to the external printing system 40, however the embodiments of disclosure are not limited to this. For example, the printer ID acquisition unit 304 may acquire printer IDs that are stored in a predetermined storage area such as the HDD 58 of the terminal device 30.

The UI control unit 301 of the terminal device 30 receives a printer selection operation (Step S1803). When the UI control unit 301 receives the printer selection operation, the print request unit 302 of the terminal device 30 transmits a print request to the external printing system 40 (Step S1804). The print request includes the printer ID selected by the user, the print target data, the print setting information, and the account ID.

Upon receiving the print request from the terminal device 30, the external printing system 40 generates a print job based on the print request and transmits, to the service provision system 10, a new job notification indicating that a print job is newly generated, for example. The new job notification includes user identification information, which identifies the user of the terminal device 30, which is a transmission source of the print request, and the printer ID described above.

In addition, the print job generated by the external printing system 40 includes, for example, a job ID that identifies a print job, a status of a print job, print data converted from the print target data, the print setting information, and the account ID.

Upon receiving the new job notification, the list acquisition unit 104 of the service provision system 10 transmits, to the external printing system 40, a job list acquisition request, for acquiring a print job associated with the account ID corresponding to the user identification information included in the new job notification (Step S1805). The job list acquisition request includes the user identification information and the printer ID described above.

In response to the job list acquisition request, the external printing system 40 transmits a job list to the service provision system 10.

Upon receiving the job list, the notification unit 105 of the service provision system transmits, to the external printing system 40, a state notification indicating a state of the service provision system 10 (e.g. "in process", "available for printing", etc.) (Step S1806). In the example of FIG. 18, the notification unit 105 may transmit, to the external printing system 40, the state notification indicating that the service provision system 10 is "in process".

Then, the job acquisition unit 106 of the service provision system 10 transmits to the external printing system 40 a request for a print job having a status of "unprocessed" in the job list acquired in the above-described Step S1805 (Step S1807). In response to the request for the print job, the external printing system 40 transmits the print job (i.e. the print job having a status of "unprocessed") according to the request.

Subsequently, the print conversion unit 107 of the service provision system 10 converts the print data included in the print job acquired by the job acquisition unit 106 into a data format suitable for executing printing with the image forming apparatus 20 (Step S1808). When the print data included in the print job acquired by the job acquisition unit 106 is in a data format suitable for printing performed by the image forming apparatus 20, the print conversion unit 107 does not have to convert the data format.

Subsequently, the job management unit 108 of the service provision system 10 acquires the apparatus ID from the printer ID (Step S1809). That is, the job management unit 108 acquires, from the apparatus ID cooperation information table 112, the apparatus ID associated with the printer ID included in the print request received from the terminal device 30.

Then, the job management unit 108 of the service provision system 10 causes the job storage unit 120 to store the print job including the apparatus ID acquired in the above Step S1809 (Step S1810). As described above, the print job 121 including the apparatus ID acquired in Step S1809 is stored in the job storage unit 120.

Subsequently, the notification unit 105 of the service provision system 10 transmits a state notification indicating a state of the service provision system 10 to the external printing system 40 (Step S1811). In the example of FIG. 18, the notification unit 105 may transmit, to the external printing system 40, the state notification indicating that the service provision system 10 is "available for printing".

As described above, the service provision system 10 according to the present embodiment stores a print job for the cloud print service provided by the external printing system 40. In addition, the print job stored in the service provision system 10 according to the present embodiment includes an apparatus ID that identifies a virtual printer selected by the user. As a result, the image forming apparatus 20 having the apparatus ID is able to execute printing of the print job.

In the present embodiment described above, the virtual printer is registered without specifying the apparatus ID in Step S1613 of FIG. 16. However, the embodiments are not limited to this, and in some embodiments, the external printing system 40 may specify an apparatus ID and register the corresponding virtual printer. When registering a virtual printer by specifying the apparatus ID, for example, the apparatus ID is included in the new job notification in Step S1804 of FIG. 18. Therefore, in this case, there is no need to perform the processing of Step S1616 of FIG. 16 and the processing of Step S1809 of FIG. 18 That is, in this case, the apparatus ID cooperation information table 112 is not required.

In addition, in the present embodiment, an application for the terminal device 30 to perform the registration process and an application for the terminal device 30 to perform the print job storing process may be application programs that are different from each other.

According to one of the embodiments of the disclosure, printing in cooperation with a cloud service can be executed by the image forming apparatus 20 that is placed around a user.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing system; comprising:
   a terminal device;
   one or more image forming apparatuses communicably connected to the terminal device using short-distance wireless communication; and
   an information processing apparatus that provides a service in cooperation with a print service provided by an external printing system,
   the terminal device being configured to
      receive an operation of selecting a particular image forming apparatus from among the one or more image forming apparatuses, and
      transmit, to the external printing system, a print request including a particular apparatus identifier identifying the particular image forming apparatus, which is selected from among the one or more image forming apparatuses, and
   the information processing apparatus being configured to
      acquire a print job generated by the external printing system based on the print request transmitted from the terminal device,
      store the acquired print job in a memory,
      receive a job acquisition request from the particular image forming apparatus,
      determine, from the print job stored in the memory, the print job being generated based on the print request including the particular apparatus identifier, the particular apparatus identifier identifying the particular image forming apparatus which has transmitted the job acquisition request, and
      transmit the print job stored in the memory to the particular image forming apparatus in response to the job acquisition request transmitted from the particular image forming apparatus.

2. The information processing system of claim 1, wherein the information processing apparatus is configured to acquire the print job in response to a notification received from the external printing system, the notification indicating that the print job is generated.

3. The information processing system of claim 1, wherein the information processing apparatus is further configured to
   determine whether a particular print job including the particular apparatus identifier identifying the particular image forming apparatus is stored in the memory, in response to the job acquisition request transmitted from the particular image forming apparatus, the job acquisition request being transmitted at predetermined time intervals, the particular image forming apparatus being a transmission source of the job acquisition request, and
   transmit, to the particular image forming apparatus, the particular print job including the particular apparatus identifier identifying the particular image forming apparatus being the transmission source of the request, in response to determining that the print job including the particular apparatus identifier identifying the image forming apparatus is stored in the memory.

4. The information processing system of claim 1, wherein the terminal device is further configured to
   receive the operation of selecting the particular image forming apparatus from among the one or more image forming apparatuses and an operation of selecting first electronic data, the first electronic data being data to be printed using the particular image forming apparatus, which is selected from among the one or more image forming apparatuses, and
   transmit, to the external printing system, the print request including the particular apparatus identifier identifying the particular image forming apparatus, which is selected from the one or more image forming apparatuses, and the first electronic data, and
   wherein the information processing apparatus is further configured to acquire, from the external printing system, the print job, which is generated based on the print request transmitted from the terminal device, the print job having second electronic data that is converted from the first electronic data.

5. The information processing system of claim 4, wherein the information processing apparatus is further configured to convert the second electronic data included in the print job into third electronic data, the third electronic data being data in a data format according to the particular image forming apparatus.

6. The information processing system of claim 5, wherein the particular image forming apparatus is configured to execute printing of the third electronic data included in the print job transmitted from the information processing apparatus.

7. The information processing system of claim 1, wherein the short-distance wireless communication is one of Bluetooth and Bluetooth Low Energy.

8. The information processing system of claim 1, wherein the particular image forming apparatus is configured to transmit the job acquisition request to the information processing apparatus at predetermined time intervals, the request including the particular apparatus identifier.

9. The information processing system of claim 1, wherein the information processing apparatus is further configured to transmit the determined print job to the particular image forming apparatus in response to the job acquisition request, which is transmitted automatically, without user input, from the image forming apparatus, the request excluding identification of the print job, wherein the particular image forming apparatus receives the print job from the information processing apparatus, and is unaware of the print job prior to receiving the print job from the information processing apparatus.

10. An information processing system; comprising:

a terminal device;

one or more image forming apparatuses communicably connected to the terminal device using short-distance wireless communication; and an information processing apparatus that provides a service in cooperation with a print service provided by an external printing system, the terminal device being configured to receive an operation of selecting a particular image forming apparatus from among the one or more image forming apparatuses, the information processing apparatus being configured to transmit, to the external printing system, a registration request to register the information processing apparatus as a printer, the registration request including a particular apparatus identifier identifying the particular image forming apparatus, which is selected from among the one or more image forming apparatuses, store a printer identifier identifying the printer registered with the external printing system in response to the registration request transmitted and the particular apparatus identifier in a first memory in association with each other, acquire a print job from the external printing system in response to a notification indicating that the print job is generated by the print service, acquire the apparatus identifier associated with the printer identifier included in the print job and store the print job including the acquired apparatus identifier in a second memory, receive a job acquisition request from the particular image forming apparatus, determine, from the print job stored in the memory, the print job being generated based on the print request including the particular apparatus identifier, the particular apparatus identifier identifying the particular image forming apparatus which has transmitted the job acquisition request, and transmit the print job stored in the memory to the particular image forming apparatus in response to the job acquisition request transmitted from the particular image forming apparatus.

11. The information processing system of claim 10, wherein the information processing apparatus is further configured to transmit the determined print job to the particular image forming apparatus in response to the job acquisition request, which is transmitted automatically, without user input, from the image forming apparatus, the request excluding identification of the print job, wherein the particular image forming apparatus receives the print job from the information processing apparatus, and is unaware of the print job prior to receiving the print job from the information processing apparatus.

12. A method of processing information performed by an information processing apparatus included in an information processing system in which a terminal device is communicably connected to one or more image forming apparatuses using short-distance wireless communication, the method comprising:

acquiring a print job generated by an external printing system based on a print request including particular apparatus identifier identifying a particular image forming apparatus selected from among the one or more image forming apparatuses via the terminal device and transmitted from the terminal device, storing the acquired print job in a memory, receiving a job acquisition request from the particular image forming apparatus, determining, from the print job stored in the memory, the print job being generated based on the print request including the particular apparatus identifier, the particular apparatus identifier identifying the particular image forming apparatus which has transmitted the job acquisition request, and transmitting the print job stored in the memory to the particular image forming apparatus in response to the job acquisition request transmitted from the particular image forming, apparatus.

13. The information processing method of claim 12, further comprising transmitting the determined print job to the particular image forming apparatus in response to the job acquisition request, which is transmitted automatically, without user input, from the image forming apparatus, the request excluding identification of the print job, wherein the particular image forming apparatus receives the print job from the information processing apparatus, and is unaware of the print job prior to receiving the print job from the information processing apparatus.

* * * * *